(12) United States Patent
Kamata

(10) Patent No.: US 6,587,643 B2
(45) Date of Patent: *Jul. 1, 2003

(54) LENS-FITTED PHOTO FILM UNIT AND PHOTOFINISHING METHOD

(75) Inventor: Kazuo Kamata, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/949,883

(22) Filed: Sep. 12, 2001

(65) Prior Publication Data

US 2002/0031340 A1 Mar. 14, 2002

(30) Foreign Application Priority Data

| Sep. 11, 2000 | (JP) | ..................................... | 2000-274712 |
| Sep. 19, 2000 | (JP) | ..................................... | 2000-282975 |
| Sep. 19, 2000 | (JP) | ..................................... | 2000-282976 |
| Sep. 22, 2000 | (JP) | ..................................... | 2000-288986 |

(51) Int. Cl.⁷ ...................... G03B 17/00; G03B 17/24; G03B 13/10
(52) U.S. Cl. ..................... 396/60; 396/380; 396/311
(58) Field of Search ........................... 396/60, 311, 380

(56) References Cited

U.S. PATENT DOCUMENTS

| 5,950,025 A | * | 9/1999 | Uchiyama et al. | .......... 396/315 |
| 6,205,296 B1 | * | 3/2001 | Hamada et al. | ............. 396/311 |
| 6,249,652 B1 | * | 6/2001 | Kamata et al. | ................ 355/40 |
| 6,311,018 B1 | * | 10/2001 | Lawther | ...................... 396/210 |
| 6,332,059 B1 | * | 12/2001 | Kamata et al. | ................ 355/32 |
| 6,429,924 B1 | * | 8/2002 | Milch | .......................... 355/27 |
| 2002/0057907 A1 | * | 5/2002 | Kamata | ......................... 396/6 |

FOREIGN PATENT DOCUMENTS

| EP | 0 430 097 A2 | * | 11/1990 | .......... G03B/17/24 |
| JP | 8-304883 | | 11/1996 | |

* cited by examiner

*Primary Examiner*—Russell Adams
*Assistant Examiner*—Andrew Sever
(74) *Attorney, Agent, or Firm*—Young & Thompson

(57) ABSTRACT

A lens-fitted photo film unit is pre-loaded with photo film, and includes a viewfinder adapted for observing an object. A selector button is operable externally, for being shifted to a standard position and a telephoto position. A view region changer lever sets the viewfinder in a standard view field when the selector button is in the standard position, and sets the viewfinder in a telephoto view field when the selector button is in the telephoto position, the telephoto view field being included in the standard view field. An information exposure unit photographically records a telephoto discernment PAR code to an information exposure region in the photo film when the selector button is in the telephoto position. The telephoto discernment PAR code includes at least three dots, for designating production of a pseudo telephoto print from a region in an imaging frame in the photo film corresponding to the telephoto view field.

9 Claims, 20 Drawing Sheets

LENS-FITTED PHOTO FILM UNIT AND PHOTOFINISHING METHOD

BACKGROUND OF THE INVENTION

1. Field of the Invention

The present invention relates to a lens-fitted photo film unit and a photofinishing method. More particularly, the present invention relates to a lens-fitted photo film unit in which information is photographically recorded for each of imaging frames and which has a simplified structure, and a photofinishing method for producing photographic prints by use of the information.

2. Description Related to the Prior Art

One type of camera is used with a photo film cassette of the IX240 type. It is possible in using the IX240 type to have a photo finisher to produce photographic prints at one of various printing aspect ratios (PAR), which include the convention (C) size, the wide-vision (H) size and the panoramic (P) size. To this end, JP-A 8-304883 discloses a construction of a camera including a selector button for the printing aspect ratios, to record an indicia photographically on photo film in a position associated with each imaging frame. A user is enabled to select any desired one of the printing aspect ratios to meet his or her intention relevant to an imaging frame. This is effective in increasing variety of photographs, because the printing aspect ratios can be changed as desired by a user unlike earlier cameras.

A lens-fitted photo film unit pre-loaded with the above-mentioned photo film cassette has been suggested. U.S. Pat. No. 6,249,652 (corresponding to JP-A 11-271872) discloses one type of the lens-fitted photo film unit in which pseudo zooming is utilized to produce photographic prints of a plurality of the printing aspect ratios. U.S. Pat. No. 5,950,025 (corresponding to JP-A 10-031249) discloses another type in which a region of a field in a viewfinder is changed over mechanically, to produce photographic prints of a plurality of the printing aspect ratios.

However, the lens-fitted photo film unit has a shortcoming in its considerably large size as compared with widely used types of the lens-fitted photo film unit which are constructed with a small thickness and small size. Such a large size is likely to raise the manufacturing cost. In general, a taking lens incorporated in the lens-fitted photo film unit is a wide-angle type, for example, has a focal length of 24 mm. Main objects photographed inside an imaging frame are likely to be considerably small. In order to obtain an enlarged photographic print or trimming print, a user sends his or his messages on various specified items to a photo shop, the items including an enlarging magnification, trimming region and the like as intended. However, production of the enlarged photographic print is laborious and very costly because of difficulties in satisfying the intentions.

SUMMARY OF THE INVENTION

In view of the foregoing problems, an object of the present invention is to provide a lens-fitted photo film unit in which information is photographically recorded for each of imaging frames, with which photographic prints in enlargement can be produced easily, and which has a simplified structure, and a photofinishing method for producing those photographic prints.

Another object of the present invention is to provide a lens-fitted photo film unit which has indicia as information for designating production of a pseudo telephoto print, and in which the indicia has a clarified and simple structure.

In order to achieve the above and other objects and advantages of this invention, a lens-fitted photo film unit pre-loaded with photo film includes a viewfinder adapted for observing an object. A selector member is operable externally, for being shifted to a standard position and a telephoto position. A view region changer sets the viewfinder in a standard view field when the selector member is in the standard position, and sets the viewfinder in a telephoto view field when the selector member is in the telephoto position, the telephoto view field being included in the standard view field. An information exposure unit photographically records telephoto discernment information to an information exposure region in the photo film when the selector member is in the telephoto position, the telephoto discernment information including at least three dots, for designating production of a pseudo telephoto print from a region in an imaging frame in the photo film corresponding to the telephoto view field.

When the selector member is in the standard position, the information exposure unit photographically records standard discernment information different from the telephoto discernment information to the information exposure region of the photo film.

The standard discernment information includes fewer dots than the telephoto discernment information.

The information exposure unit includes an exposure light emitter for applying information recording light to the information exposure region. A changer plate is movable between first and second positions with respect to the exposure light emitter, for being away from a light path of the information recording light or for blocking a portion of the light path when in the first position, so as to record the telephoto discernment information, and for blocking a portion or entirety of the light path when in the second position. A transmission mechanism sets the changer plate in the first position when the selector member is in the telephoto position, and sets the changer plate in the second position when the selector member is in the standard position.

The exposure light emitter includes a body inner wall opposed to the information exposure region. A light source is disposed inside the body inner wall, for emitting the information recording light. At least three projecting holes are formed in the body inner wall, for introducing the information recording light to the information exposure region, to record respectively the dots. The changer plate, when in the first position, is away from the at least three projecting holes, and when in the second position, blocks one or more of the at least three projecting holes.

The viewfinder includes at least one stationary lens element and at least one movable lens element movable with reference to the stationary lens element. The view region changer includes a moving mechanism, connected between the selector member and the movable lens element, for setting the movable lens element to a short focus position when the selector member is in the standard position, and for setting the movable lens element to a long focus position when the selector member is in the telephoto position, so as to form the standard view field and the telephoto view field selectively.

In one aspect of the invention, a photofinishing method for producing a photographic print from an imaging frame in photo film is provided. If production of a pseudo telephoto print is intended by use of a trimming region of the imaging frame, telephoto discernment information including at least three dots is photographically recorded to an information exposure region in the photo film at a time of an exposure of the imaging frame. The photo film is processed. Printing light is applied to the imaging frame in the photo film. It is checked whether the telephoto discernment information exists. If it is judged that the telephoto discernment information does not exist, an object image of the imaging frame is focused to photographic paper at a standard enlarging magnification. If it is judged that the telephoto discernment information exists, the object image of the imaging frame is focused to the photographic paper at a telephoto enlarging magnification that is higher than the standard enlarging magnification.

Furthermore, if production of a standard print is intended by use of the imaging frame, standard discernment information different from the telephoto discernment information is photographically recorded to the information exposure region in the photo film at a time of an exposure of the imaging frame.

In another aspect of the invention, a lens-fitted photo film unit pre-loaded with photo film includes a taking lens having a predetermined angle of view and a predetermined focal length. A viewfinder has a telephoto view field associated with a smaller angle of view than the predetermined angle of view, the smaller angle of view corresponding to a telephoto focal length that is 1.5–2 times as great as the predetermined focal length.

Furthermore, telephoto discernment information is photographically recorded to an information exposure region in the photo film, for designating production of a pseudo telephoto print from a region in an imaging frame in the photo film corresponding to the telephoto view field.

Furthermore, there is external information for externally indicating designation of producing the pseudo telephoto print.

The predetermined focal length is 20–35 mm.

The information exposure region is disposed along a lateral edge of the photo film, and the telephoto discernment information is a bar code.

The lens-fitted photo film unit is packaged in a packaging bag. The packaging bag includes auxiliary external information for externally indicating designation of producing the pseudo telephoto print.

According to a preferred embodiment, furthermore, at least two reflection mirrors direct object light from the taking lens to the photo film by reflection.

The predetermined focal length is 70–120 mm.

In an additional aspect of the invention, a viewfinder has a telephoto view field associated with a smaller angle of view than the predetermined angle of view, the smaller angle of view corresponding to a telephoto focal length that is 1.3–1.7 times as great as the predetermined focal length.

The predetermined focal length is 20–25 mm.

The information exposure region is disposed along a lateral edge of the photo film, and the telephoto discernment information is a code including binary digits.

In still another aspect of the invention, a photofinishing method for producing a photographic print from an imaging frame in photo film of a lens-fitted photo film unit is provided. It is checked whether telephoto discernment information exists in the lens-fitted photo film unit, the telephoto discernment information being adapted for designating production of a pseudo telephoto print from a trimming region in the imaging frame in the photo film. The photo film is processed. Printing light is applied to the imaging frame in the photo film. If it is judged that the telephoto discernment information does not exist, an object image of the imaging frame is focused to photographic paper at a standard enlarging magnification. If it is judged that the telephoto discernment information exists, the object image of the imaging frame is focused to the photographic paper at a telephoto enlarging magnification that is 1.3–2 times as high as the standard enlarging magnification.

The telephoto discernment information is photographically recorded to an information exposure region in the photo film.

The information exposure region is disposed along a lateral edge of the photo film, and the telephoto discernment information is a bar code.

According to another preferred embodiment, the information exposure region is disposed along a lateral edge of the photo film, and the telephoto discernment information is a code including binary digits.

The telephoto discernment information is recorded at a time of exposing the imaging frame.

The telephoto discernment information includes at least three dots.

BRIEF DESCRIPTION OF THE DRAWINGS

The above objects and advantages of the present invention will become more apparent from the following detailed description when read in connection with the accompanying drawings, in which.

DETAILED DESCRIPTION OF THE PREFERRED EMBODIMENT(S) OF THE PRESENT INVENTION

Figure 1:
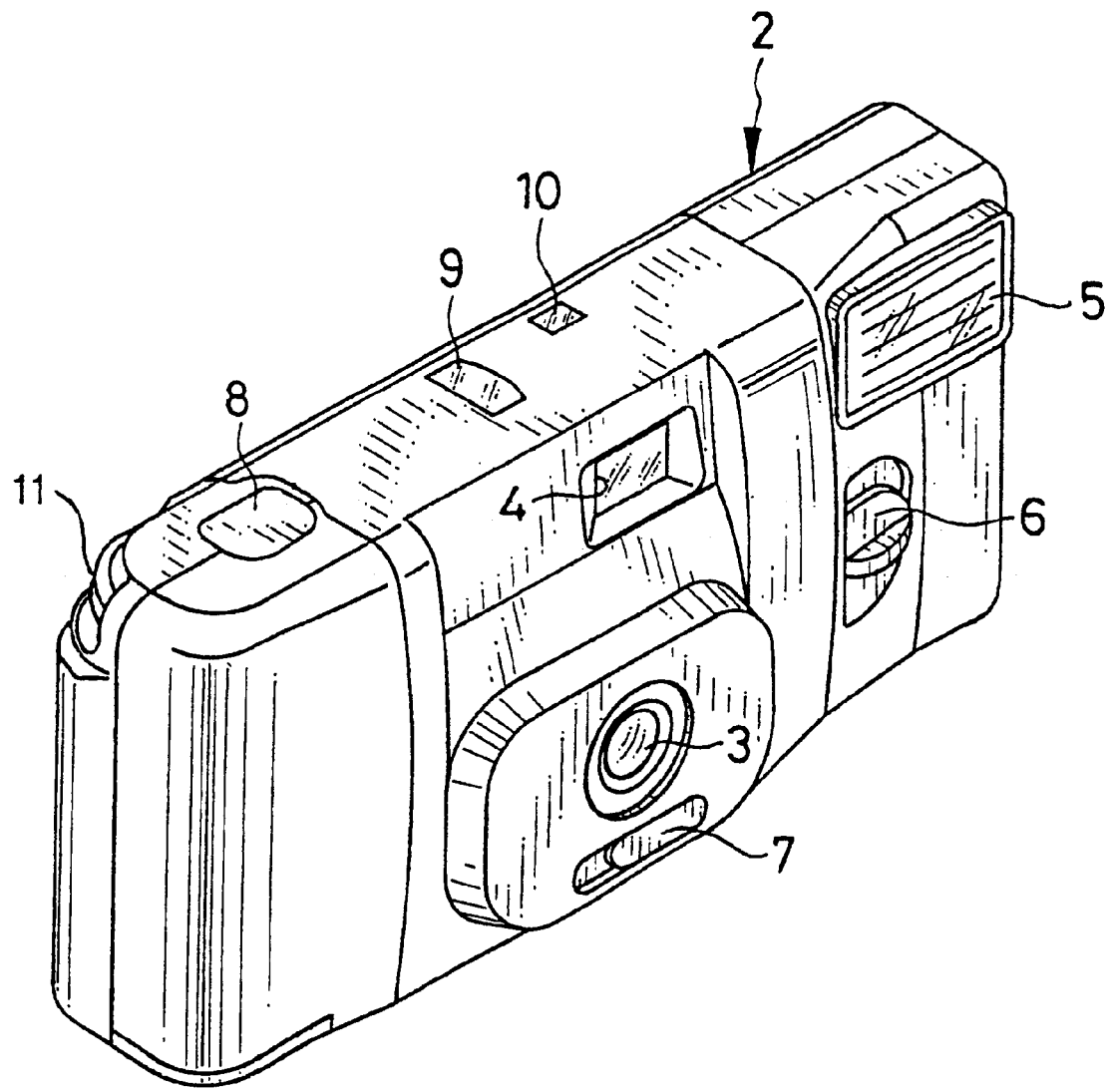
FIG. 1 is a perspective illustrating a lens-fitted photo film unit.

In FIG. 1, a lens-fitted photo film unit 2 is illustrated. A front side of the lens-fitted photo film unit 2 includes a taking lens 3, an objective window 4, a flash emitter 5, a flash charger button 6 and a selector button 7. An upper side of the lens-fitted photo film unit 2 has a shutter release button 8, a frame counter window 9 and a light guide 10. A rear side of the lens-fitted photo film unit 2 is has a winder wheel 11 and an eyepiece window 12 partially uncovered externally. For the eyepiece window 12, see FIG. 2.

The selector button 7 is slidable on a front face of the lens-fitted photo film unit 2 in its longitudinal direction. The selector button 7 is slidable between the standard position and telephoto position. When the selector button 7 is in the standard position, the magnification of the viewfinder is equal to that according to the conventional lens-fitted photo film unit, to obtain a photographic print of the C size from the photographic paper. When the selector button 7 is in the telephoto position, the magnification of the viewfinder is 1.63 times as high as that according to the standard position, to obtain a photographic print in enlargement at the C size from the photographic paper.

Figure 2:
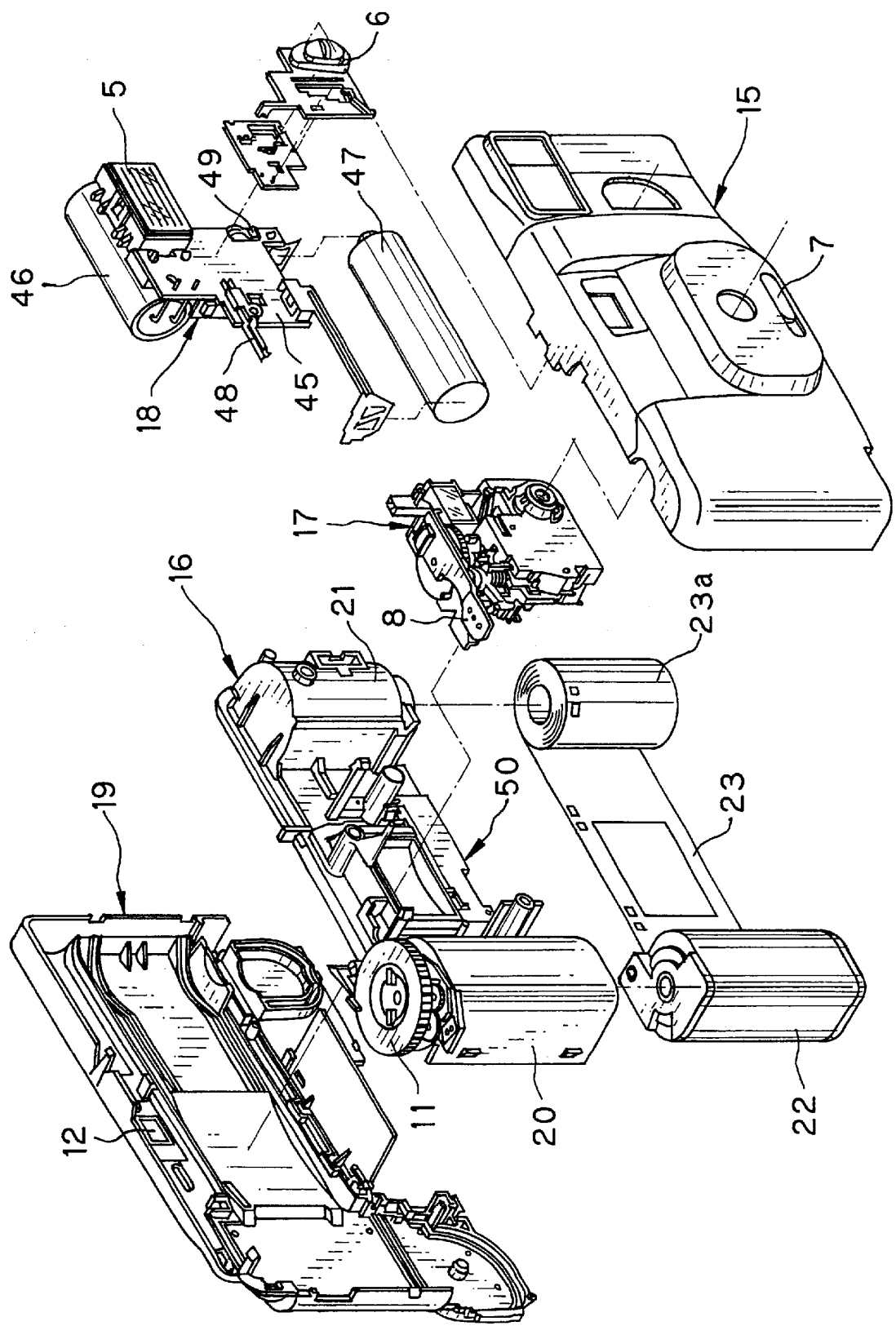
FIG. 2 is an exploded perspective illustrating the lens-fitted photo film unit.

In FIG. 2, the lens-fitted photo film unit 2 includes a front cover 15, a main body 16, an exposure unit 17, a flash unit 18 and a rear cover 19. There are a cassette holder chamber 20 and a roll holder chamber 21 disposed respectively at ends of the main body 16. A photo film cassette 22 of the IX240 type is inserted in the cassette holder chamber 20. A photo film 23 is drawn from the photo film cassette 22 and wound as a photo film roll 23a, which is inserted in the roll holder chamber 21.

Figure 3:
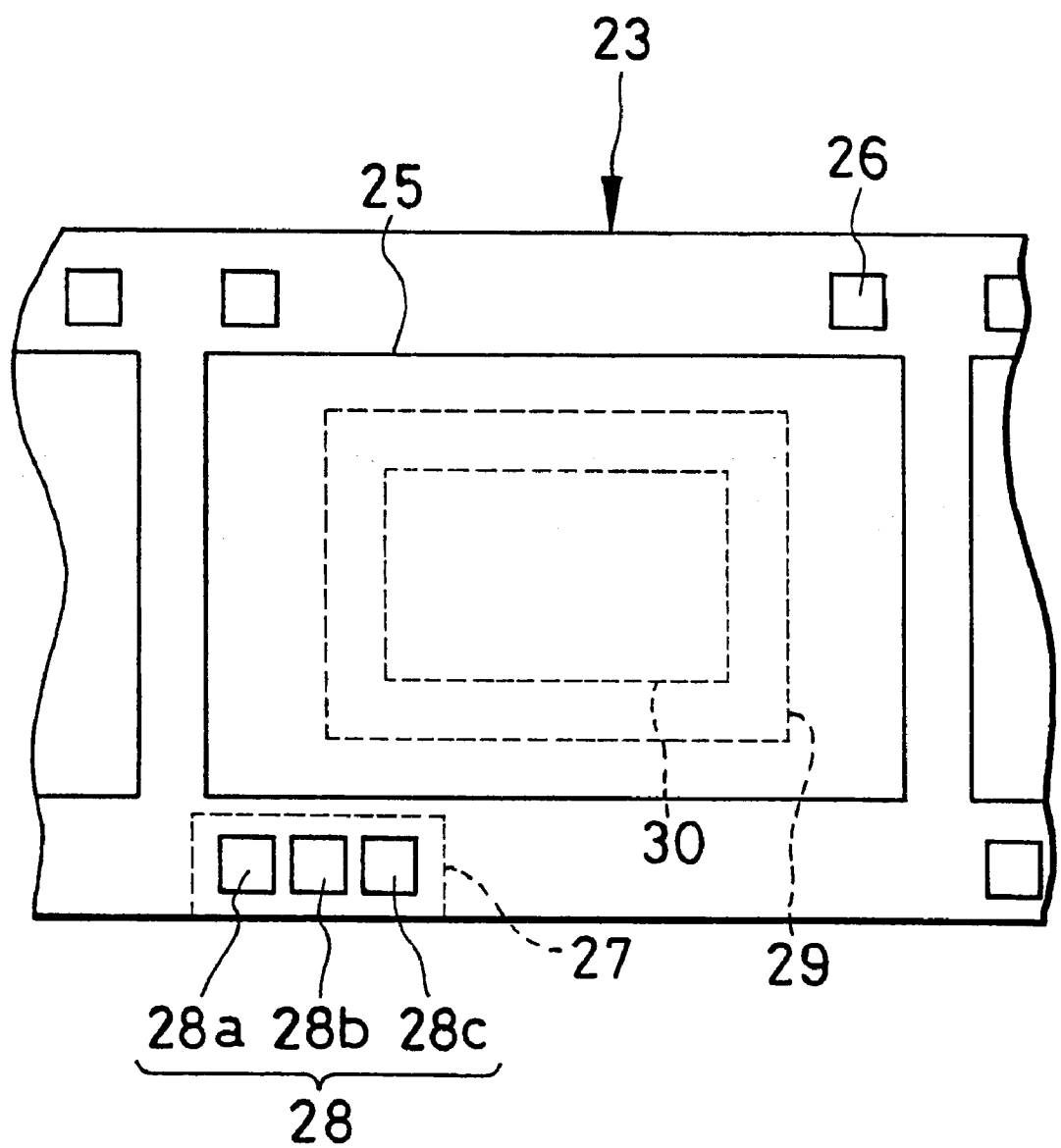
FIG. 3 is a plan illustrating photo film with imaging frames.

In FIG. 3, an imaging frame 25 is located in the photo film 23 of the IX240 type. Perforations 26 are formed in one edge portion of the photo film 23 and associated respectively with the imaging frame 25. An information exposure region 27 is formed in one remaining edge portion of the photo film 23 and associated respectively with the imaging frame 25. A discernment PAR code 28 is printed to the information exposure region 27 in a manner well-known in the art, and designates one of the H size (89×158 mm), the P size (89×254 mm) and the C size (89×127 mm) of a photographic print.

The discernment PAR code 28 to be imprinted at each frame has positions for first, second and third code dots 28a, 28b and 28c. If the discernment PAR code 28 has the first code dot 28a and the second code dot 28b and not the third code dot 28c, then a C trimming region 29 is designated in the imaging frame 25 to be printed for obtaining a photographic print of the C size. If the discernment PAR code 28 has all the code dots 28a, 28b and 28c, a telephoto trimming region 30 is designated in the imaging frame 25 to be printed for obtaining a pseudo telephoto photographic print in a manner photographed at a telephoto magnification 1.63 times as high as a standard magnification.

Figure 4:
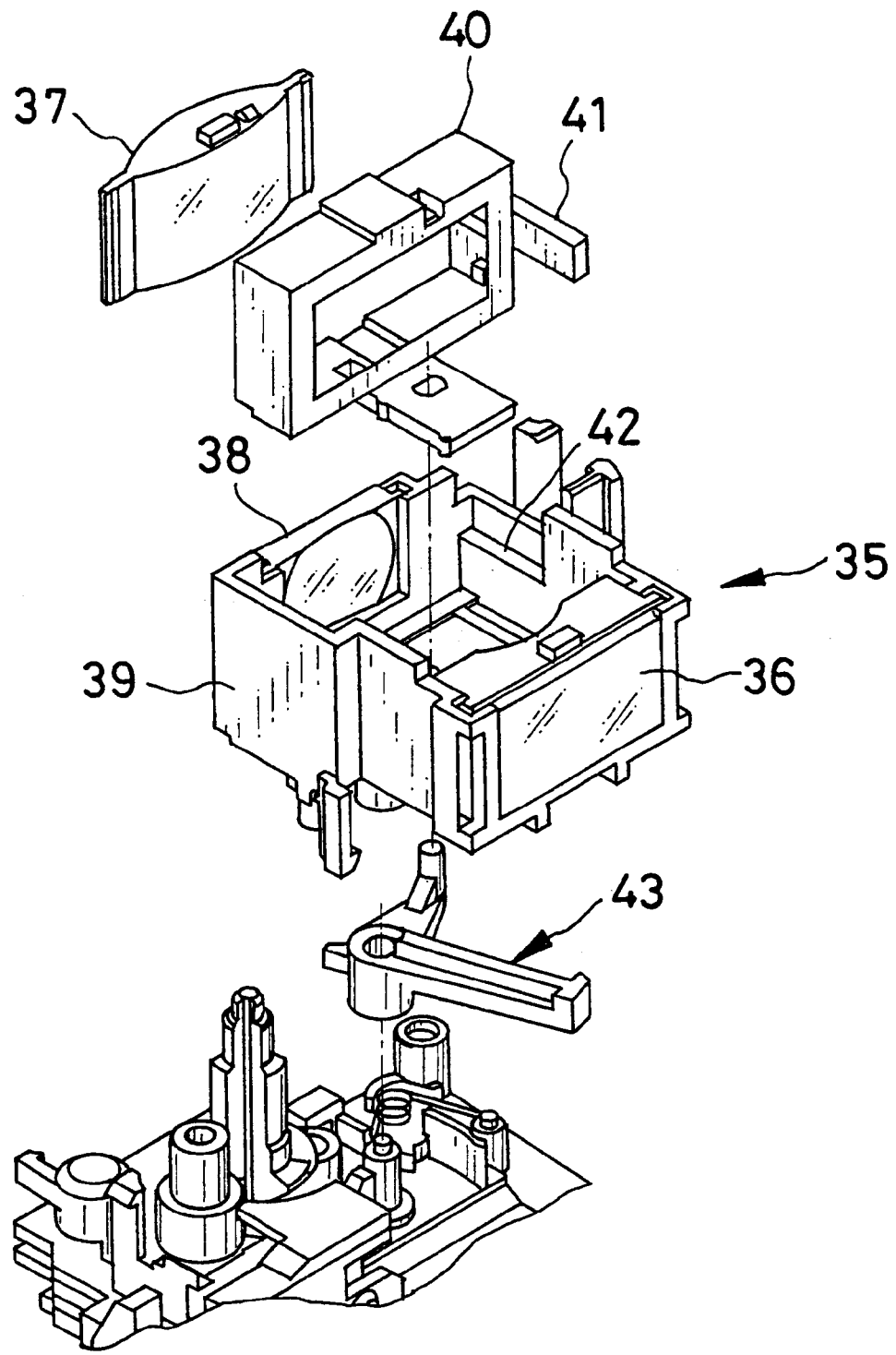
FIG. 4 is an exploded perspective illustrating a viewfinder.

In FIG. 2, the exposure unit 17 is provided at a light-shielding tunnel (not shown), and has a shutter mechanism and a viewfinder 35 detailed in FIG. 4. The shutter release button 8 is formed in a deformable manner at the top of the exposure unit 17, and actuates the shutter mechanism when depressed. The shutter mechanism is a type in which a shutter blade makes one swing in front of a shutter opening. Upon the swing of the shutter blade, object light passes the front opening in the front cover 15 and then the taking lens 3 in the exposure unit 17, and passes the shutter opening and becomes incident on the photo film 23 set at the exposure aperture. Note that the taking lens 3 used in the embodiment is a wide-angle type.

In FIG. 4, the viewfinder 35 is constituted by an objective lens element 36, a movable lens element 37 and an eyepiece lens element 38. The objective lens element 36 and the eyepiece lens element 38 are stationary lens elements. A viewfinder holder 39 supports the objective lens element 36 and the eyepiece lens element 38 in a fixed manner, and is secured to a top of the light-shielding tunnel in a removable manner. A movable barrel 40 supports the movable lens element 37. A rod 41 is associated with the movable barrel 40. A groove 42 is formed in the viewfinder holder 39, and guides the movable barrel 40 in cooperation with the rod 41. A view region changer lever 43 in an L shape is fitted on the lower side of the movable barrel 40. The view region changer lever 43 is supported in a rotatable manner by a pivotal pin formed with the upper side of the light-shielding tunnel. The movable lens element 37 is slid in parallel with the viewfinder optical axis upon rotation of the view region changer lever 43. At the time of standard photography, the movable lens element 37 is moved toward the objective lens element 36. At the time of the telephotography, the movable lens element 37 is moved toward the eyepiece lens element 38.

In FIG. 2, the flash unit 18 is a component including a flash circuit board 45, a main capacitor 46, a battery 47, a trigger switch 48, a flash switch 49 and the flash emitter 5. When the flash charger button 6 is slid up on the front face of the front cover 15, the flash switch 49 is turned on. Thus, the main capacitor 46 is charged. After the charging, the shutter release button 8 is depressed. The shutter blade switches on sync segments of the trigger switch 48. In response to the switching on, the main capacitor 46, having being charged at a high voltage, is discharged to cause the discharge tube to emit flash light from the flash emitter 5 toward a photographic field.

Figure 5:
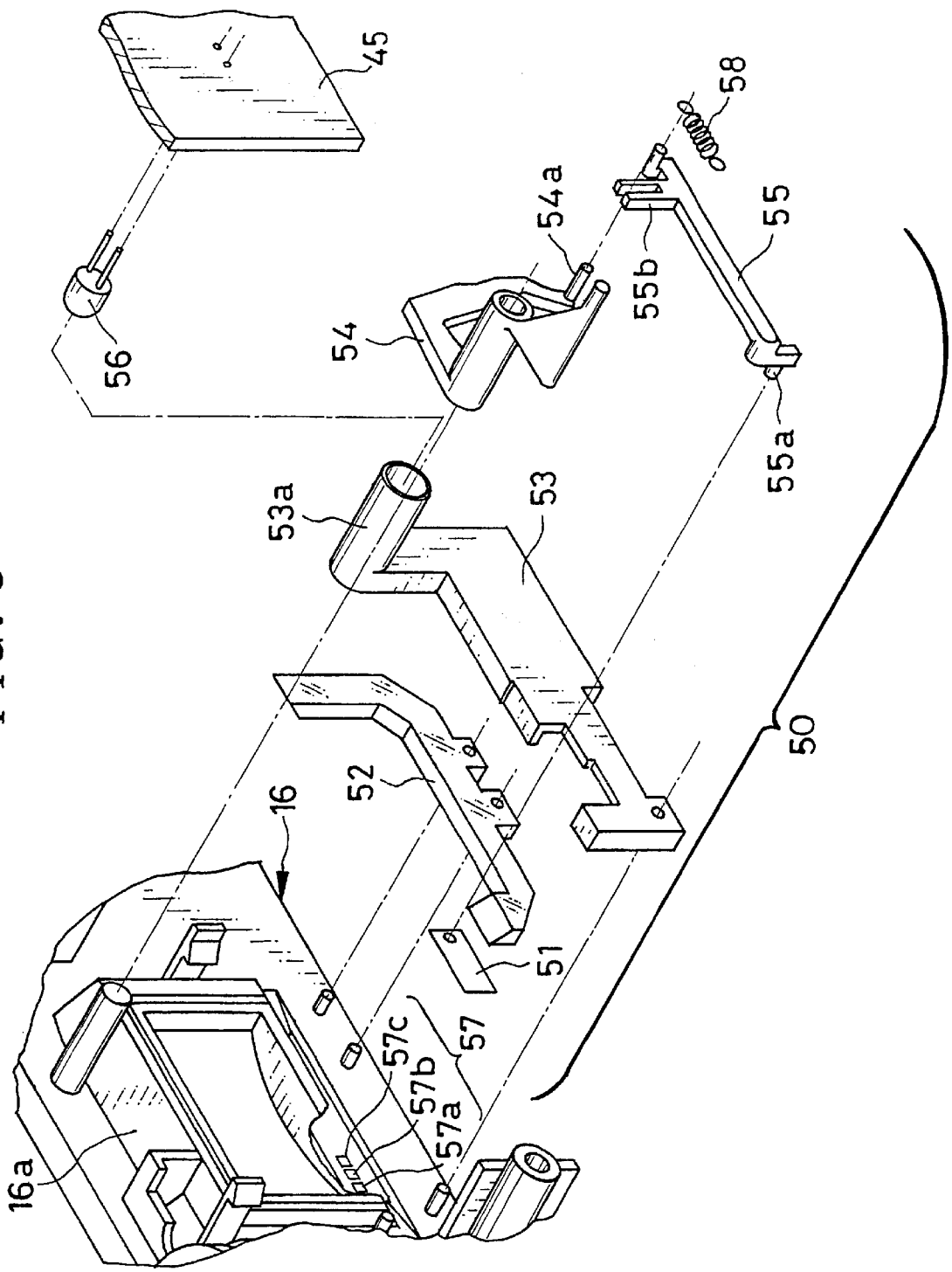
FIG. 5 is an exploded perspective illustrating an information exposure unit for recording a discernment PAR code.

In FIG. 5, an information exposure unit 50 is secured to a lower side of the main body 16. The information exposure unit 50 includes a changer plate 51, a recording light guide 52, a light blocking cover 53, a rotatable transmission lever 54, a slidable transmission plate 55, and a light source LED (light-emitting diode) 56. The main body 16 has a body inner wall 16a of a light-shielding tunnel. An exposure light emitter 57 is disposed in a lower portion of the body inner wall 16a, and records the discernment PAR code 28 to the information exposure region 27 for designating a printing condition. The exposure light emitter 57 includes first, second and third light projecting holes 57a, 57b and 57c. The changer plate 51 is disposed outside the exposure light emitter 57, and is kept slidable horizontally. A pin 55a projects from an end of the slidable transmission plate 55, and is engaged with the changer plate 51. At the time of the standard photography, the changer plate 51 closes only the third projecting hole 57c. At the time of the telephotography, the changer plate 51 is away from all the projecting holes 57a–57c.

The front of the changer plate 51 is provided with the recording light guide 52 and the light blocking cover 53. The slidable transmission plate 55 is kept slidable horizontally on the front face of the light blocking cover 53. A tension coil spring 58 has one end which is secured to the slidable transmission plate 55 and biases the slidable transmission plate 55 toward the left. A fork 55b is formed to project from the slidable transmission plate 55. One lever end 54a of the rotatable transmission lever 54 is engaged with the fork 55b, the rotatable transmission lever 54 having an extended shape on a side of the body inner wall 16a. The changer plate 51 is slid by the slidable transmission plate 55 horizontally in response to rotation of the rotatable transmission lever 54, to determine the number of code dots of the discernment PAR code 28 to be recorded.

The light source LED 56 is connected to the flash circuit board 45. The light source LED 56 emits light in synchronism with turning on of the trigger switch 48. A tubular portion 53a is formed with the light blocking cover 53. The light emitted by the light source LED 56 is passed through the tubular portion 53a and becomes incident upon an end of the recording light guide 52, and is directed toward the exposure light emitter 57 by internal reflection of surfaces of the recording light guide 52.

Figure 6:
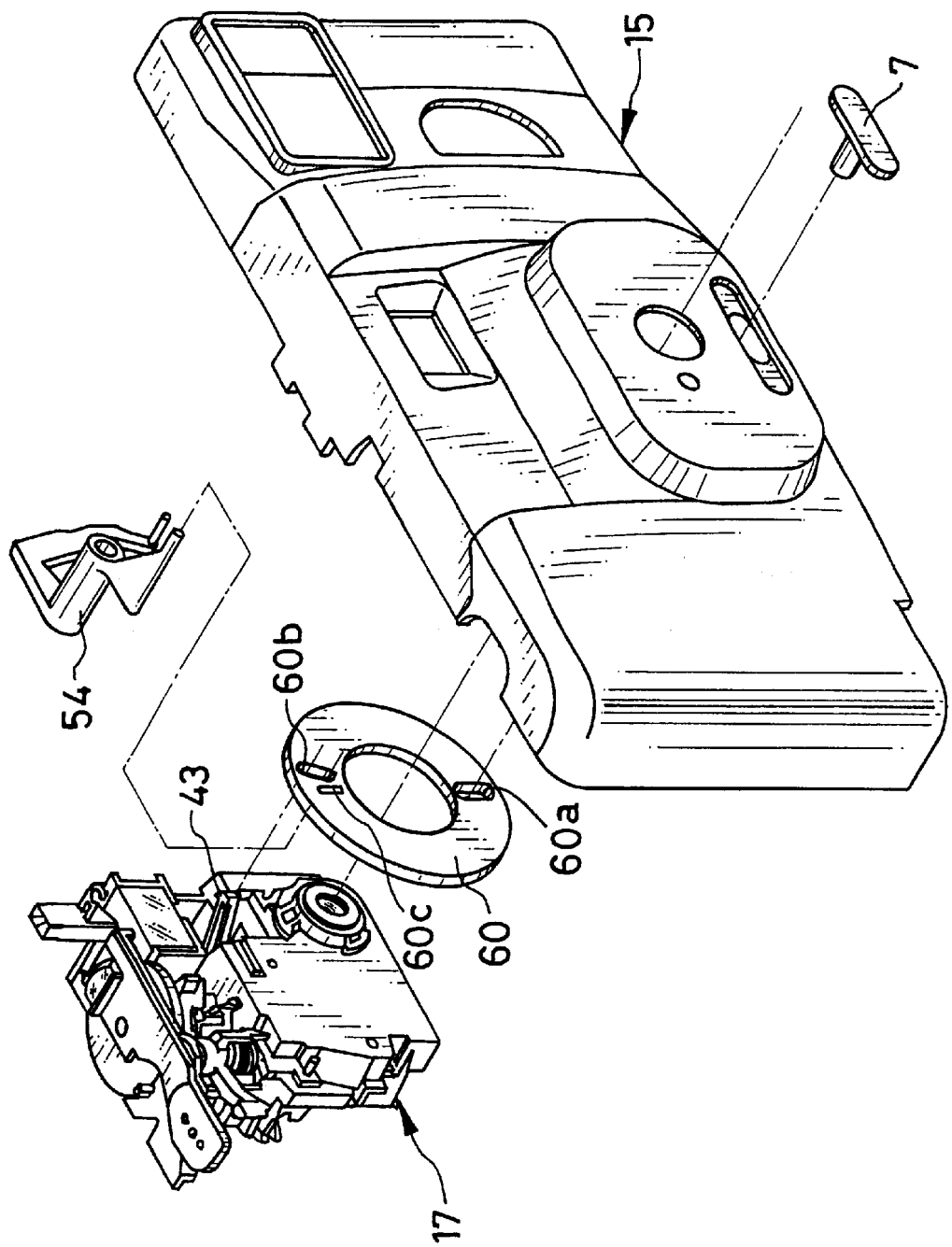
FIG. 6 is an exploded perspective illustrating a selector button and a transmission mechanism disposed in a front cover and an exposure unit.

In FIG. 6, a rotatable transmission ring 60 is secured to the rear of the front cover 15 in a rotatable manner, and includes guide holes 60b and 60c. The view region changer lever 43 of the viewfinder 35 is engaged with the guide hole 60b. The rotatable transmission lever 54 of the information exposure unit 50 is engaged with the guide hole 60c. Also, a guide hole 60a is formed in the rotatable transmission ring 60. The selector button 7 is engaged with the rotatable transmission ring 60 at the guide hole 60a. When the selector button 7 is slid, the rotatable transmission ring 60 is rotated to link the view region changer lever 43 with the rotatable transmission lever 54. When the selector button 7 is moved to the standard position disposed in the right, the movable lens element 37 is moved toward the objective lens element 36 to set the viewfinder at the standard magnification. The changer plate 51 is slid to the left to block the third projecting hole 57c. Thus, the discernment PAR code 28 with two code dots is recorded to the information exposure region 27 in the photo film 23.

When the selector button 7 is slid to the telephoto position located to the left in the drawing, the movable lens element 37 is caused by the view region changer lever 43 to move toward the eyepiece lens element 38, to set the viewfinder at a telephoto magnification that is 1.63 times as high as the standard magnification. At the same time, rotation of the rotatable transmission lever 54 moves the information exposure unit 50 to the right to open the third projecting hole 57c. An exposure is taken. Three code dots of the discernment PAR code 28 are recorded in the information exposure region 27 of the photo film 23.

Figure 7A:
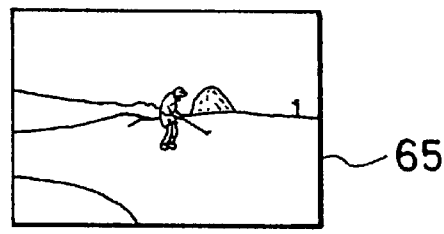
FIG. 7A is a plan illustrating a viewfinder field adapted for the standard photography.
Figure 8A:
FIG. 8A is a plan illustrating a viewfinder field in a state set for telephotography.

The operation of the above embodiment is described now. A user sets the selector button 7 at either of the standard position on the right side and the telephoto position on the left side. Positioning of the selector button 7 causes the rotatable transmission ring 60 to slide the movable lens element 37 on the viewfinder optical axis, to change the magnification of the viewfinder 35. The user observes a photographic field through the eyepiece window 12, to check an object to be photographed. In the standard photography, the object is observed through a viewfinder field 65 as illustrated in FIG. 7A, at the size equal to that according to a conventional lens-fitted photo film unit. In the telephotography, the object is observed through the viewfinder field 65 as illustrated in FIG. 8A, at 1.63 times as large a size as that of the standard photography.

The selector button 7 is slid to cause the rotatable transmission lever 54 to slide the changer plate 51 to a position according to the magnification of the viewfinder. A user observes a photographic field through the eyepiece window 12 before the shutter release button 8 is depressed to take an exposure.

Figure 7B:
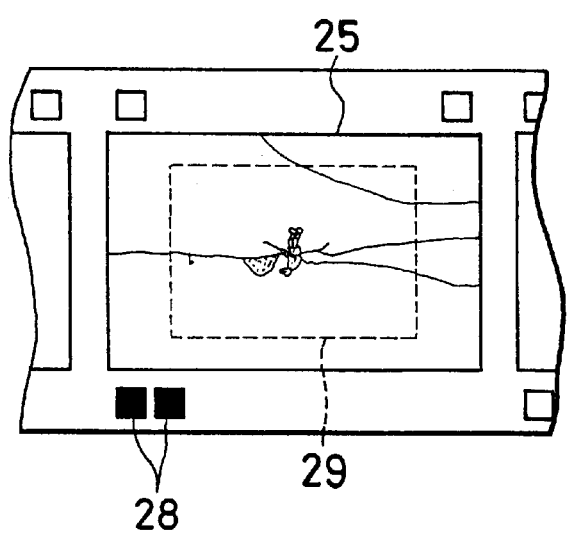
FIG. 7B is a plan illustrating the imaging frame with a standard discernment PAR code.
Figure 8B:
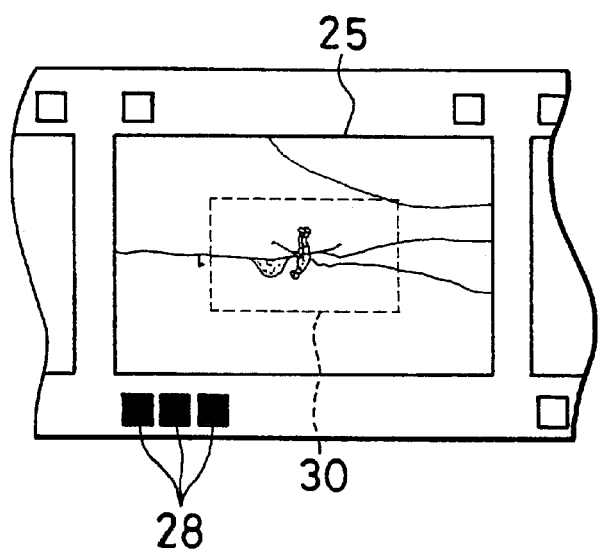
FIG. 8B is a plan illustrating an imaging frame with a telephoto discernment PAR code.

The shutter release button 8 is depressed to actuate the shutter mechanism. An exposure is taken. Light passed through the taking lens 3 becomes incident upon the photo film 23, to expose the entirety of the imaging frame 25. The shutter blade is opened and closed to turn on the trigger switch 48, at the same time as the light source LED 56 emits light. The light enters the recording light guide 52, is guided and emitted toward the projecting holes 57a–57c of the exposure light emitter 57. As the changer plate 51 is positioned, light passed through at least one selected from the projecting holes 57a–57c is applied to the information exposure region 27 in a lower position of the photo film 23. In the case of the standard photography, the discernment PAR code 28 has two code dots as depicted in FIG. 7B. In the case of the telephotography, the discernment PAR code 28 has three code dots as depicted in FIG. 8B. Note that the size of the object in the imaging frame 25 of the photo film 23 is equal between the standard photography and the telephotography.

Thus, the viewfinder magnification is determined for each of the exposures. After all frames are exposed, the lens-fitted photo film unit 2 is forwarded to a photo shop and then to a photo laboratory. In the photo laboratory, the photo film 23 is removed from the lens-fitted photo film unit 2 and developed, and is subjected to printing. In a photographic printer, photographic prints are produced according to processes determined by the discernment PAR code 28 in the information exposure region 27.

Figure 7C:
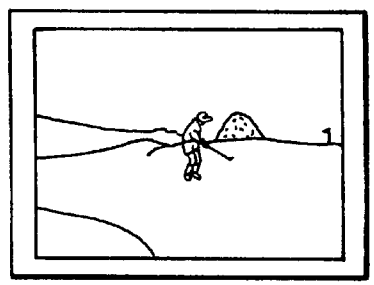
FIG. 7C is a plan illustrating a photographic print obtained from the imaging frame.

In the photographic printer, it is judged whether the discernment PAR code 28 in the information exposure region 27 has two or three code dots at each of the imaging frames. If the discernment PAR code 28 has code dots as illustrated in FIG. 7B, the paper mask device is actuated to designate the C trimming region 29. An enlarging printing lens for the standard printing or for the C-size printing is set, which has an enlarging magnification of 5.7 times. An imaging frame is printed to the photographic paper of the C size or standard size in a manner similar to the case of FIG. 7C.

Figure 8C:
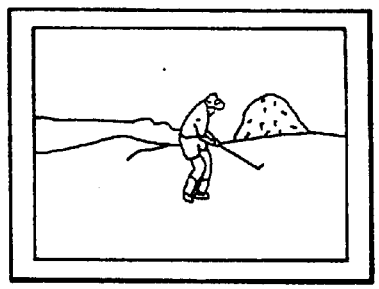
FIG. 8C is a plan illustrating a photographic print obtained from the imaging frame.

In FIG. 8B, the discernment PAR code 28 is judged to have three code dots. Then the telephoto trimming region 30 is selectively set by the paper mask device. An enlarging printing lens for panoramic printing is set, which has an enlarging magnification of 9.3 times. An imaging frame is printed to the photographic paper of the C size or standard size in a manner similar to the case of FIG. 7B. As illustrated in FIG. 8C, a print is produced at the enlarging magnification that is 1.63 times as high as the standard magnification.

In the above embodiment, the discernment PAR code 28 includes two or three code dots for designating the printing condition according to the viewfinder magnification. Furthermore, it is possible to prerecord the first code dot 28*a* and the second code dot 28*b* in the manufacturing process for the standard photography, and to record the third code dot 28*c* at the time of taking an exposure. Also, the maximum number of recordable code dots may be higher or lower than three.

In the above embodiment, the viewfinder magnification is changed to designate the field of view selectively without changing the size of the field in the viewfinder. However, the field of view may be designated selectively by inserting a mask plate into a viewfinder light path. The mask plate can have an opening corresponding to the telephoto trimming region, to reduce the size of the field of view without changing the viewfinder magnification.

In the above embodiment, it is considered that the discernment information for the printing aspect ratio has been widely used as a combination of zero, one or two code dots. If the discernment information has two code dots, the standard printing is designated for producing a print at the C size. If the discernment information has three code dots differently from the two code dots, the telephoto printing is designated for producing a print in enlargement at the C size. Alternatively, it is possible that, if the discernment information has no code dot, the standard printing is designated for producing a print at the H size, and if the discernment information has three code dots differently from zero dot, the telephoto printing is designated for producing a print in enlargement at the H size. In the printing at the H size, it is possible to use the paper mask device specialized for the aspect ratio of the H size, but to use the photographic paper and the enlarging printing lens of the types used in the printing at the C size.

In the above embodiment, the discernment PAR code 28 is recorded to the photo film by exposing the emulsion surface oriented to the front. However, the light source including the recording light guide 52 and the light source LED 56 may be disposed behind the photo film, and may record the discernment PAR code 28 through a back surface of the photo film.

In the above embodiment, the printing lenses have plural fixed focal lengths and are selectively set in the printer. However, a photographic printer may have a zooming printing lens of which a focal length can be varied as desired.

Figure 9:
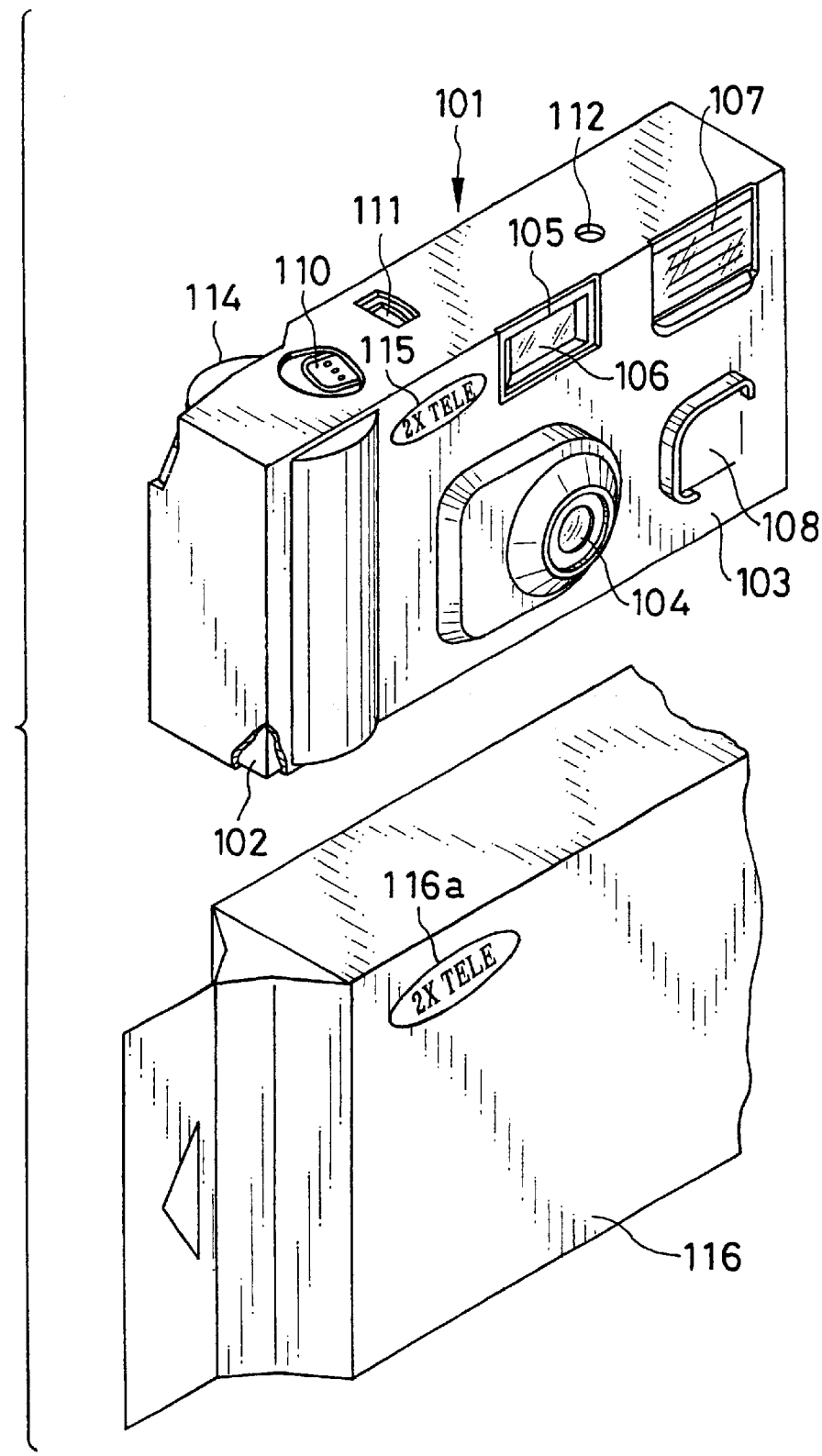
FIG. 9 is an exploded perspective illustrating another preferred lens-fitted photo film unit of a type of 2-time telephoto.

In FIG. 9, another preferred lens-fitted photo film unit 101 is illustrated, which is a type specialized for the pseudo telephoto printing. A housing 102 of the lens-fitted photo film unit 101 is pre-loaded with photo film of 135 type available in the market. A packaging sticker box 103 wraps the housing 102 except for partial openings.

The lens-fitted photo film unit 101 has the front where a taking lens 104 and an objective window 106 of a viewfinder 105, a flash emitter 107 and a charger button 108 are provided, has the upper side where a shutter release button 110, a frame counter window 111, and an indicator light guide 112 are provided, has the rear where a winder wheel 114 and an eyepiece window (not shown) of the viewfinder 105 are located. The charger button 108 is depressed for charging the flash unit. The frame counter window 111 indicates the number of remaining available frames. The indicator light guide 112 indicates completion of charging of the flash unit. The winder wheel 114 is rotated at each time of one exposure. The eyepiece window is directly behind the objective window 106.

The packaging sticker box 103 has adhesive agent on its back surface, is attached to the central portion of the housing 102. A number of openings are formed in the packaging sticker box 103, and uncover portions of the taking lens 104, the viewfinder 105, the frame counter window 111 and the like externally. A packaging bag 116 is used to wrap the lens-fitted photo film unit 101 in a tightly sealed manner, and is formed from a resin sheet having an internal aluminum coating. External information 115 is provided on an outside of the packaging sticker box 103 to indicate that the lens-fitted photo film unit 101 is specialized for telephotography. Similarly, auxiliary external information 116*a* is provided on an outside of the packaging bag 116.

Figure 10:
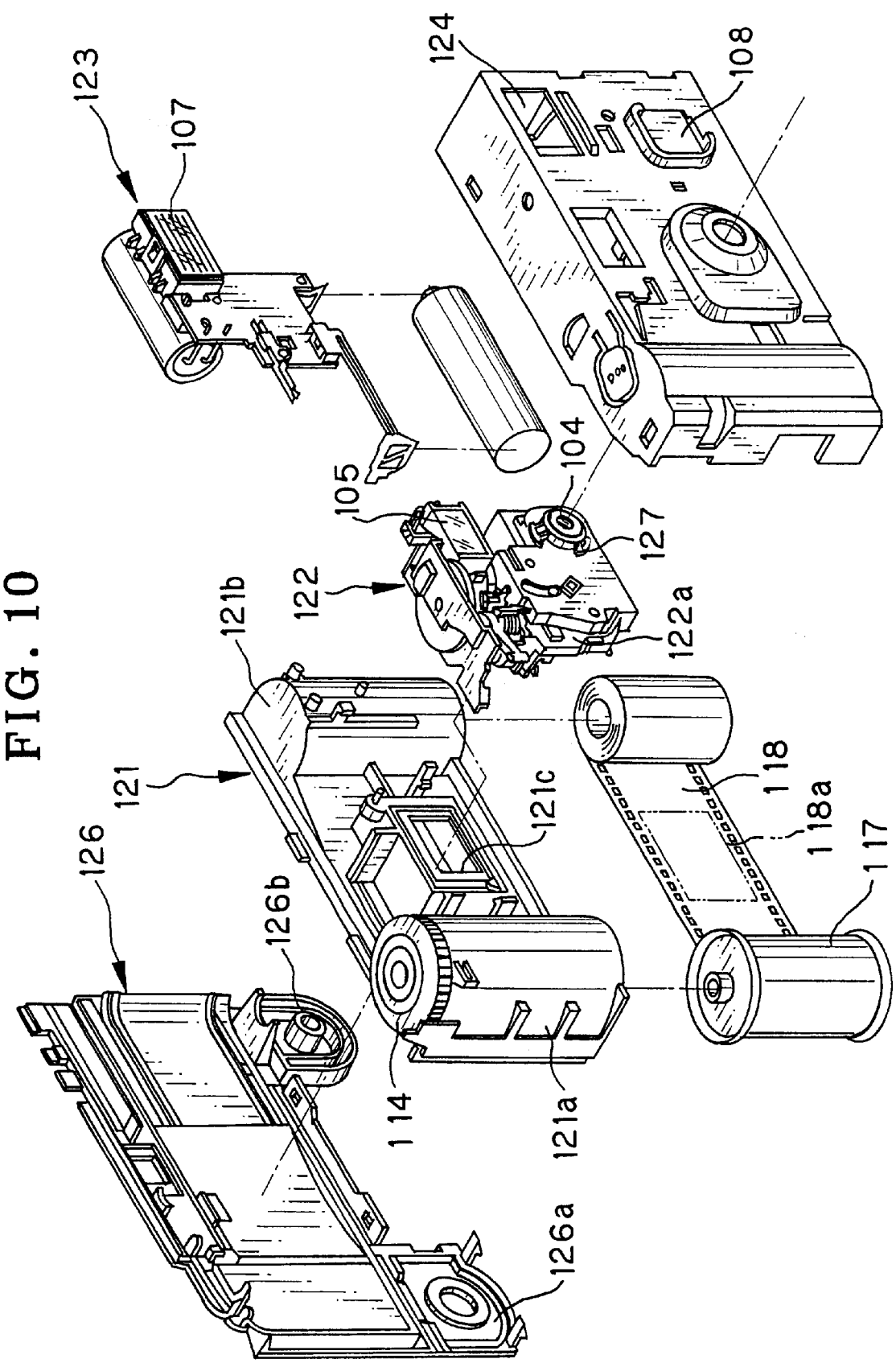
FIG. 10 is an exploded perspective illustrating the lens-fitted photo film unit of FIG. 9.

In FIG. 10, the housing 102 includes a main body 121, an exposure unit 122, a flash unit 123, a front cover 124 and a rear cover 126. Photo film 118 is preloaded in the main body 121. The exposure unit 122 and the flash unit 123 are secured to the front of the main body 121. The front cover 124 and the rear cover 126 cover the front and rear of the main body 121.

The main body 121 is one molded piece having a cassette holder chamber 121*a* and a roll holder chamber 121*b*. A photo film cassette 117 is contained in the cassette holder chamber 121*a*. A roll of the photo film 118 drawn from the photo film cassette 117 is contained in the roll holder chamber 121*b*. An exposure aperture 121*c* is formed in the center of the main body 121. An imaging frame 118*a* is created on the photo film 118 as a region exposed inside the exposure aperture 121*c* by the light from the taking lens 104.

Figure 11:
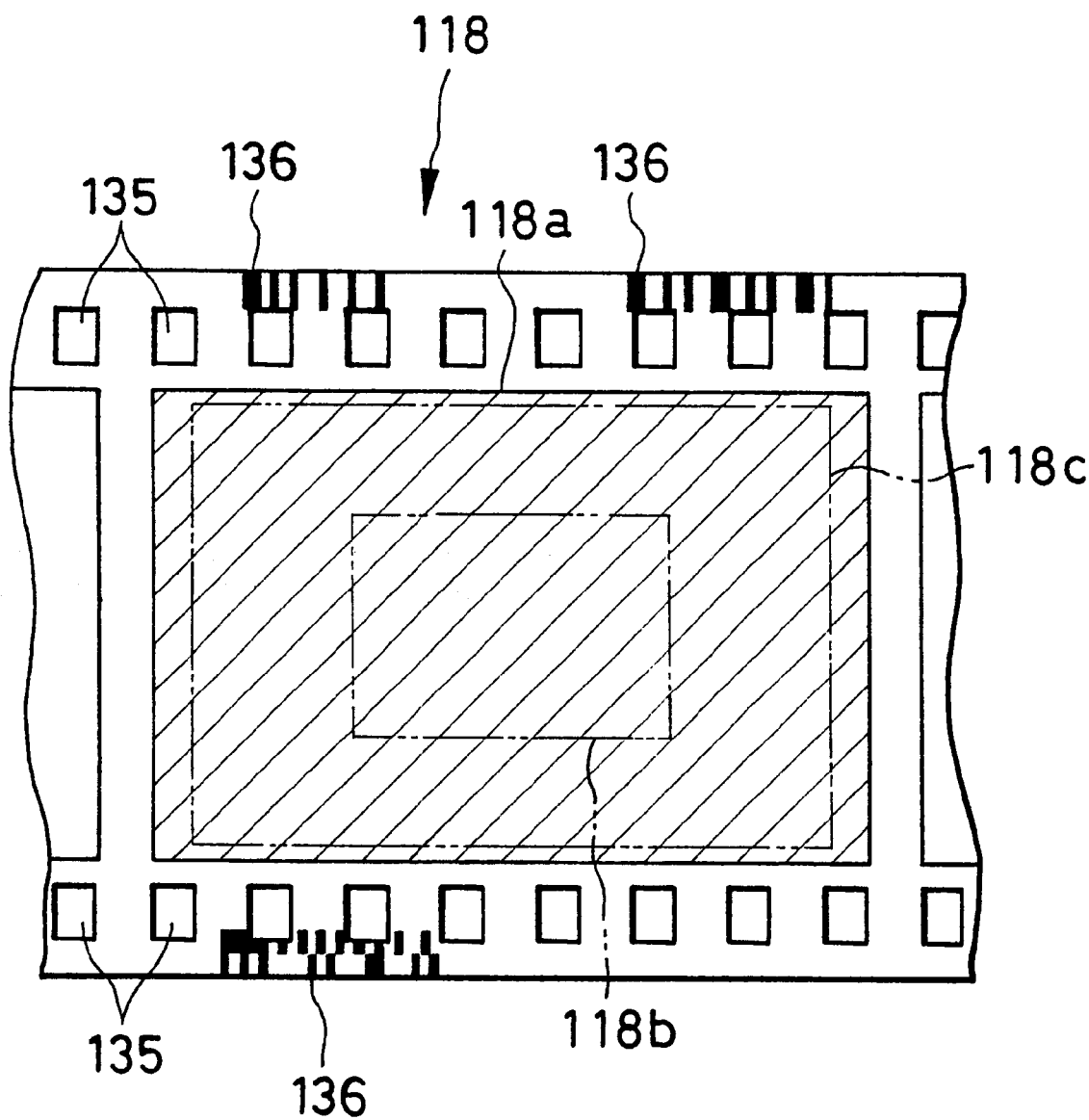
FIG. 11 is a plan illustrating photo film with imaging frames.

In FIG. 11, perforations 135 are formed in both edge portions of the photo film 118 at a regular pitch. A bar code 136 as telephoto discernment information is recorded by side printing, and represents the type, frame numbers and the like of the photo film, and becomes visible when the photo ago film 118 is developed. As the photo film 118 is preloaded in the course of manufacturing process, it is possible for the bar code 136 to include information of the use in the lens-fitted photo film unit. Even after the photo film 118 is removed from the lens-fitted photo film unit upon completion of all the exposures, it is possible to recognize the use in the lens-fitted photo film unit of FIG. 9 upon checking the bar code 136.

The exposure unit 122 to be secured to the front of the main body 121 is a unit including a base portion 122*a*, which is provided with a shutter mechanism, a photo film retention mechanism, the viewfinder 105 and the like. The viewfinder 105 is an optical viewfinder including an objective lens element and an eyepiece lens element. A lens holder 127 keeps the taking lens 104 positioned in front of the base portion 122*a*.

The taking lens 104 has a focal length of 32 mm. In the present embodiment, a photographic print is produced by the photographic printer according to the pseudo telephoto printing at a magnification ratio of 2 with reference to the standard photography, or in a manner of a photograph which would be obtained by use of a taking lens with a focal length of 64 mm. The view field of the viewfinder 105 is ¼ as large as the view field of a viewfinder of a conventional lens-fitted photo film unit, in consideration of a standard view field which would be obtained by use of the taking lens with the focal length of 64 mm. Note that the center of the view field of the viewfinder 105 is determined equal to that of the standard view field.

It is noted that an error is likely to occur in feeding of the photo film in creating a frame in the lens-fitted photo film unit, so as to offset the region to be printed. In consideration of this, the view field of the viewfinder is determined smaller than the region to be printed. In the present embodiment, the view field of the viewfinder 105 is determined approximately 80% as large as the printing region.

The rear cover 126 is secured behind the main body 121 and keeps the inside of the main body 121 shielded from ambient light. Lower lids 126a and 126b are formed with the rear cover 126 and cover respectively lower sides of the cassette holder chamber 121a and the roll holder chamber 121b. The lower sides are openings, which are closed by the lower lids 126a and 126b after loading of the photo film cassette 117. Also, the lower lid 126a is opened after the use of the lens-fitted photo film unit 101, to remove the photo film cassette 117 accommodating the photo film 118 from the cassette holder chamber 121a.

Figure 12:
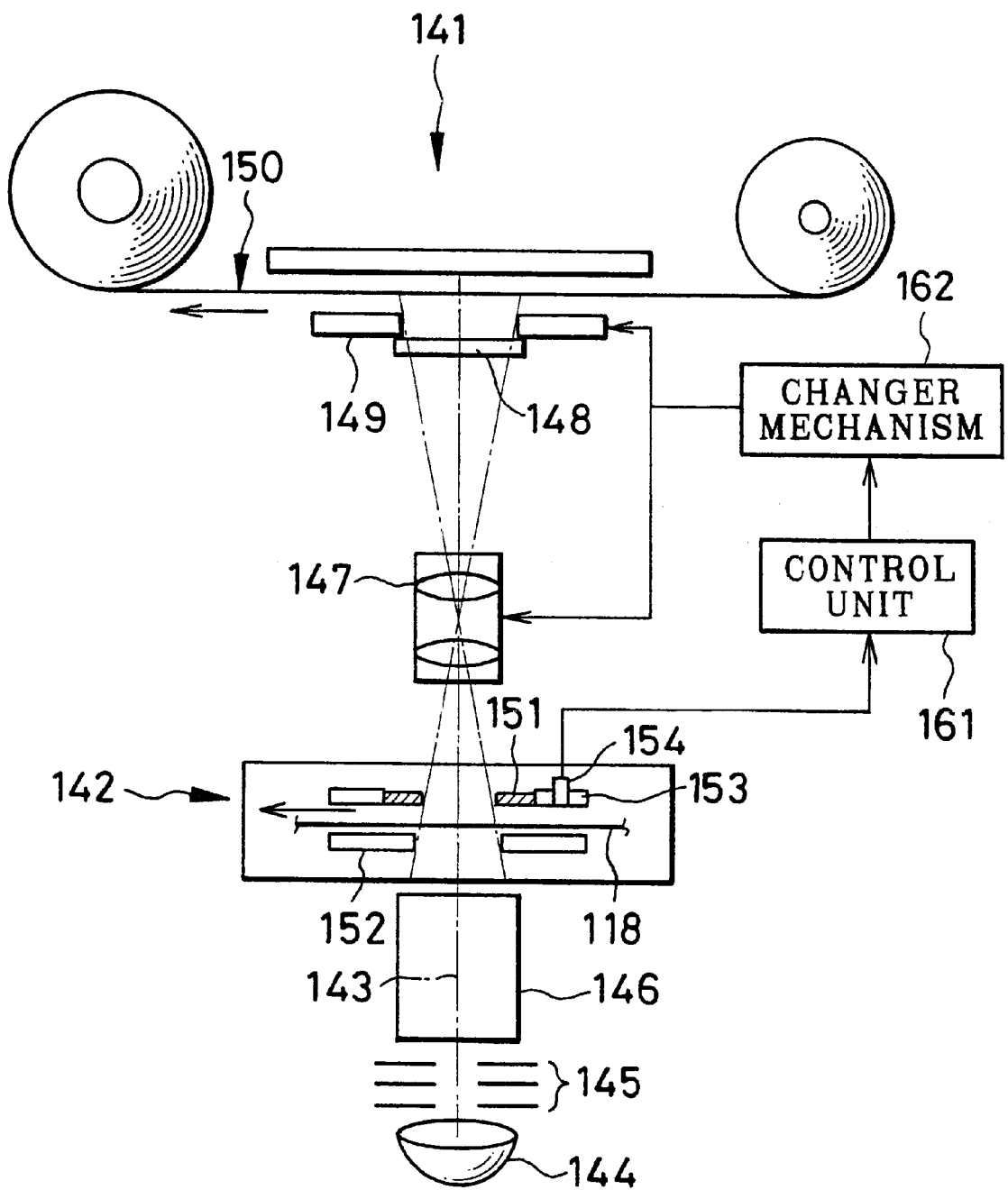
FIG. 12 is an explanatory view in elevation, illustrating a photographic printer.

In FIG. 12, a photographic printer 141 of the invention is depicted, and produces prints from the photo film 118 removed from the lens-fitted photo film unit 101. In the photographic printer 141, a photo film carrier 142 well-known in the art is disposed. The photo film carrier 142 includes a photo film mask device 151, a carrier base plate 152 and a cover plate 153. The photo film 118 is fed through the photo film carrier 142 between the carrier base plate 152 and the cover plate 153, and stopped to position a frame at a printing light path 143.

There are a light source 144, a light quality adjustor 145 and a diffuser box 146 arranged along the printing light path 143. The light quality adjustor 145 adjusts light quality of the printing light by adjusting amounts of insertion of yellow, magenta and cyan color filters into the printing light path 143.

Above the photo film carrier 142 are disposed a printing lens 147, a printer shutter 148, a paper mask device 149 and photographic paper 150 in sequence at the printing light path 143. The printer shutter 148 operates for adjusting an amount of printing light. The paper mask device 149 defines a trimming region. The printing lens 147 focuses an imaging frame of the photo film 118 on to the emulsion surface of the photographic paper 150 under illumination of the light source 144. A changer mechanism 162 is incorporated in the photographic printer 141 to change over the printing lens 147 and the paper mask device 149 automatically according to a size, shape or the like of a photographic print.

An information detector 154 or sensor is disposed on the cover plate 153 for reading the bar code 136 of the photo film 118. A control unit 161 is supplied with the data of the bar code 136 read by the information detector 154, and controls various elements of the photographic printer 141. The control unit 161 designates a state of the printing lens 147 and the paper mask device 149 to be used according to data represented by the bar code 136. The control unit 161 actuates the changer mechanism 162 to set the printing lens 147 and the paper mask device 149 suitably.

Figure 13:
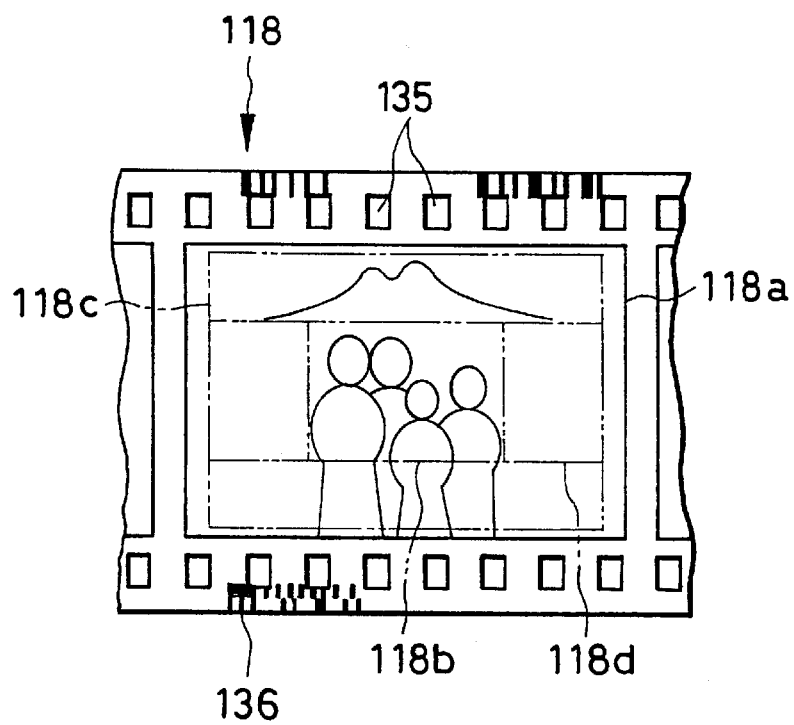
FIG. 13 is a plan illustrating the photo film after being developed.
Figure 14A:
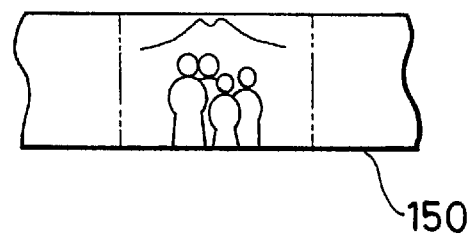
FIG. 14A is a plan illustrating a photographic print of the L size.
Figure 14B:
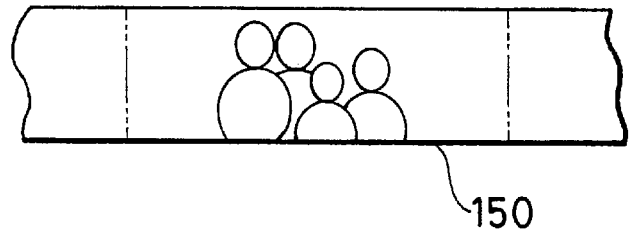
FIG. 14B is a plan illustrating a photographic print of the panoramic size.

In FIG. 13, an L trimming region 118c is indicated by the phantom line, and is a region printed to the photographic paper 150 by use of the printing lens 147 for the L size as standard size. A panoramic trimming region 118d is indicated by the phantom line, and is a region printed to the photographic paper 150 by use of the printing lens 147 for the panoramic size. With reference to the negative image, the printing lens 147 has a magnification of 3.96 times for the L size, and has a magnification of 7.91 times for the panoramic size. In the L-size printing, the L trimming region 118c is printed as depicted in FIG. 14A. In the panoramic printing, the panoramic trimming region 118d is printed as depicted in FIG. 14B.

Figure 14C:
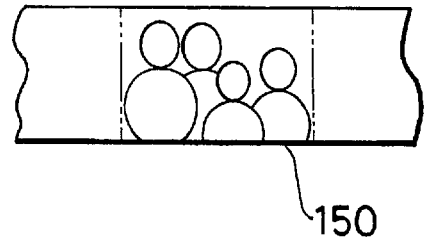
FIG. 14C is a plan illustrating a pseudo telephoto print of the L size.

For printing operation, the paper mask device 149 for the L size and the printing lens 147 for the panoramic size are used. The printing lens 147 for the L size has a magnification of 3.96 times with reference to the photo film. The printing lens 147 for the panoramic size has a t magnification of 7.91 times with reference to the photo film. The magnification of the printing lens 147 for the panoramic size is approximately 2 times as high as that of the printing lens 147 for the L size. The use of the printing lens 147 for the panoramic size causes the printing in enlargement of approximately 2 times. As the paper mask device 149 of the L size is used, a telephoto trimming region 118b is printed to the photographic paper 150 at the L size as illustrated in FIG. 14C. The center of the telephoto trimming region 118b is equal to that of the imaging frame 118a, and also is geometrically similar to the same.

The operation of the embodiment is described now. In the manufacturing line for the lens-fitted photo-film unit, the photo film 118 is drawn from the photo film cassette 117 and wound as a roll, which is inserted in the main body 121. The bar code 136 is preprinted to the photo film 118 by side printing to inform the use of the photo film 118 in a preloaded state in the lens-fitted photo film unit.

After the photo film 118 and the photo film cassette 117 are inserted, the rear cover 126 is secured to the rear, to obtain the housing 102. The packaging sticker box 103 is attached to the housing 102, and is then packaged together in the packaging bag 116 in a tightly enclosed state. As the external information 115 and the auxiliary external information 116a are printed on the packaging sticker box 103 and the packaging bag 116 to indicate the use of the lens-fitted photo film unit 101 for 2-time telephotography, users do not misread the type of the lens-fitted photo film unit 101 at the purchasing or using time.

After a user purchases the lens-fitted photo film unit 101, he or she removes the lens-fitted photo film unit 101 from the packaging bag 116, and rotates the winder wheel 114. The photo film 118 is wound up by one frame. The shutter mechanism is charged and gets ready for an exposure. The user observes a photographic field through the viewfinder 105, and frames a photographic object. As the viewfinder 105 has two times as high a magnification as that according to an angle of view of the taking lens 104, the user views the photographic object in an enlarged manner.

When the shutter release button 110 is depressed, the shutter mechanism is actuated to open and close the shutter blade for an exposure. While the shutter blade opens, object light passed through the taking lens 104 enters the exposure aperture 121c and becomes incident upon the emulsion surface of the photo film 118. As the lens-fitted photo film unit 101 has the taking lens 104 with the focal length of 32 mm, an object image is photographed in the imaging frame 118a illustrated in FIGS. 11 and 13. A portion of the photo film 118 at the bar code 136 is not exposed. To take another exposure, the user rotates the winder wheel 114 again, to set the photo film 118 in a predetermined position.

The lower lid 126a of the lens-fitted photo film unit 101 is opened to remove the photo film cassette 117 from the cassette holder chamber 121a. The photo film 118 being exposed is removed from the photo film cassette 117, and set in a photo film processor, and processed.

The photo film 118 being processed is set in the photo film carrier 142 of the photographic printer 141. When the photographic printer 141 is started, the photo film 118 is fed frame by frame. When the frames are set in the predetermined position, the information detector 154 reads the bar code 136. As described heretofore, a portion of the bar code 136 includes discernment information representing the use of the photo film 118 in the lens-fitted photo film unit 101. The discernment information is sent to the photographic printer 141. The discernment information is used for printing operation with the printing lens of the panoramic printing and the paper mask device for the L size.

The control unit 161 drives the changer mechanism 162 to set a type of the printing lens 147 for a panoramic size. The type of the printing lens 147 for an L size has a magnification of 3.96 times. The type of the printing lens 147 for a panoramic size has a magnification of 7.91 times. A ratio of the magnification of those is approximately 2. Also, a type of the paper mask device 149 for the L size is selected, to trim the telephoto trimming region 118b to be printed. Then the light source 144 is driven to produce a print from the photographic paper 150. The telephoto trimming region 118b depicted in FIGS. 11 and 13 is printed to the photographic paper 150 at the L size. See FIG. 14C.

After printing is completed, the photographic paper 150 and the photo film 118 are fed by one frame. As a portion of the bar code 136 for each of the imaging frames represents the discernment information, the telephoto trimming region 118b in each imaging frames as depicted in FIG. 11 is printed to the photographic paper 150 of the L size in enlargement of 2 times. Note that, if the strip of the photo film is subjected to printing without being cut, it is unnecessary in relation to the second imaging frame and those following the second to read the discernment information from the bar code 136, as the discernment information related to the first imaging frame is still effective for the second and following imaging frames.

Therefore, the number of parts of the lens-fitted photo film unit can be reduced. Its structure can be simplified. The lens-fitted photo film unit can be manufactured at a low cost. Printing can be efficient, because of no complexity in operation of printing.

In the present embodiment, the printing lens 147 has a magnification of 3.96 times for the L size with reference to the imaging frame, and has a magnification of 7.91 times for the panoramic size. The panoramic print is produced in enlargement of approximately 2 times with reference to production of the L-size print. Also, it is possible that the printing lens 147 has a magnification of 7.0, 7.95 or 8.0 times or so for the panoramic size.

In the present embodiment, the telephoto print is produced in enlargement of approximately 2 times with reference to production of the L-size print. Also, it is possible that a telephoto print is produced in enlargement of 1.5 times or so with reference to the L-size print. Furthermore, a printing lens for the wide-vision (H) size may be used instead of the printing lens for the L size or for the panoramic size. However, a telephoto print can be produced only in enlargement of 1.2 times, because the printing lens for the wide-vision (H) size has a magnification of 4.77 times with reference to a negative image. There are relatively small effects in using the printing lens for the wide-vision (H) size in combination with the photographic paper for the L size. It is concluded that the use of the printing lens for the panoramic size is remarkably effective in combination with the photographic paper for the L size.

In the above embodiment, the photo film cassette is 135 type. However, a lens-fitted photo film unit of the invention may contain a photo film cassette of IX240 type. In the case of using IX240 type, the PAR code for the printing aspect ratio may be extended to record the discernment information described heretofore.

The photo film used in the present embodiment may be the IX240 type. The photographic paper having a width of 89 mm and 102 mm is used in combination therewith. If the photographic paper has the width of 89 mm, the printing lens has a magnification of 5.7 times for the C size and has a magnification of 9.3 times for the panoramic size. If the photographic paper has the width of 102 mm, the printing lens has a magnification of 6.5 times for the C size and has a magnification of 10.6 times for the panoramic size. It is possible with the photographic paper having both of the widths 89 mm and 102 mm to produce a print at a magnification ratio of 1.63 between the printing sizes. It is concluded that, if the taking lens has the focal length of 24 mm, a telephoto print can be obtained in a manner of telephotography at a focal length of 39 mm which is 1.63 times as long as 24 mm.

In the above embodiment, the bar code 136 is used as discernment indicia or discernment information. Alternatively, a circular indicia may be recorded additionally as discernment information. Also, it is possible to record the discernment information at each time of taking an exposure. To this end, a notch may be formed in the exposure aperture 121c. Also, an indicia recorder may be incorporated. The indicia shape and the indicia recording method may be determined for recognizing the photographic printer 141.

In the above embodiment, the discernment indicia of the photo film 118 is used. However, the photo film 118 may have no discernment information. The external information printed on the packaging sticker box 103 to indicate 2-time telephoto makes it possible to designate the printing lens 147 and the paper mask device 149. Also, in order for a user to inform designation of 2-time telephoto printing, he or she may request an attendant of a photo shop to produce prints according to 2-time telephoto printing. Also, he or she may fill in an order form to give information of the request to a photo finisher. If a photo shop receives the request only in a state of the photo film contained in the photo film cassette 117, it is possible to indicate the request on the outer surface of the photo film cassette 117, in a manually written manner or a manner of attaching a sticker. Also, 2 time telephoto printing may be requested by use of information of a portion of a bar code disposed with the photo film cassette 117 in a conventional manner.

In the photographic printer 141, the discernment information is detected to change over the printing lens 147 and the paper mask device 149 automatically. Alternatively, an operator may change over the printing lens 147 and the paper mask device 149 manually by himself or herself. It is possible to produce a telephoto print in 2-time enlargement even by use of a conventional printer without the automated selecting operation.

Figure 15:
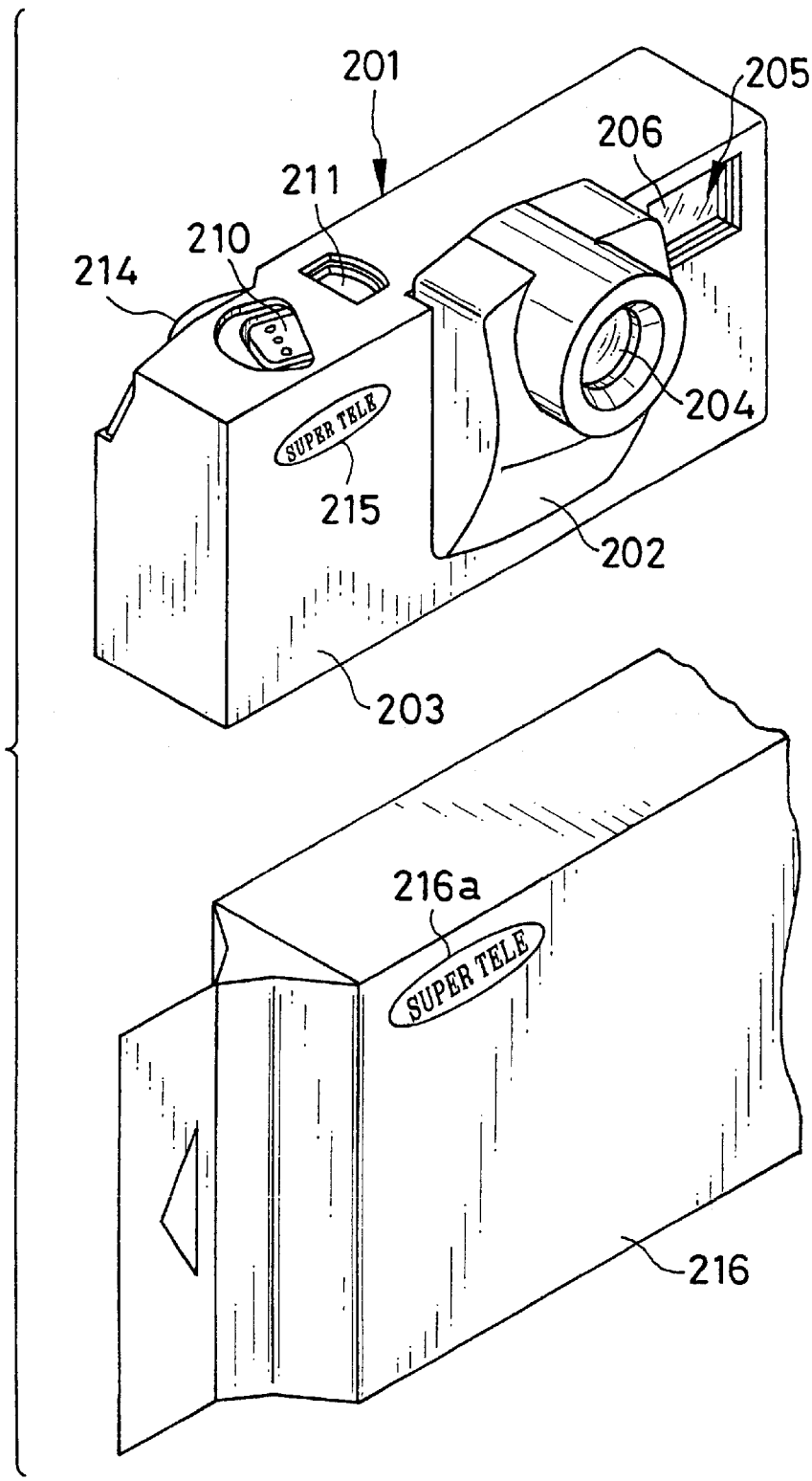
FIG. 15 is an exploded perspective illustrating an additional preferred lens-fitted photo film unit of a type of 6-time telephoto.

In FIG. 15, still another lens-fitted photo film unit 201 is depicted, in which a considerably great focal length is provided with two mirrors combined with a taking lens 204. The lens-fitted photo film unit 201 has the front where the taking lens 204 and an objective window 206 of a viewfinder 205 are provided, has the upper side where a shutter release button 210 and a frame counter window 211 are provided, has the rear where a winder wheel 214 and an eyepiece window (not shown) of the viewfinder 205 are located. The frame counter window 211 indicates the number of remaining available frames. The winder wheel 214 is rotated at each time of one exposure. The eyepiece window is directly behind the objective window 206.

Figure 16:
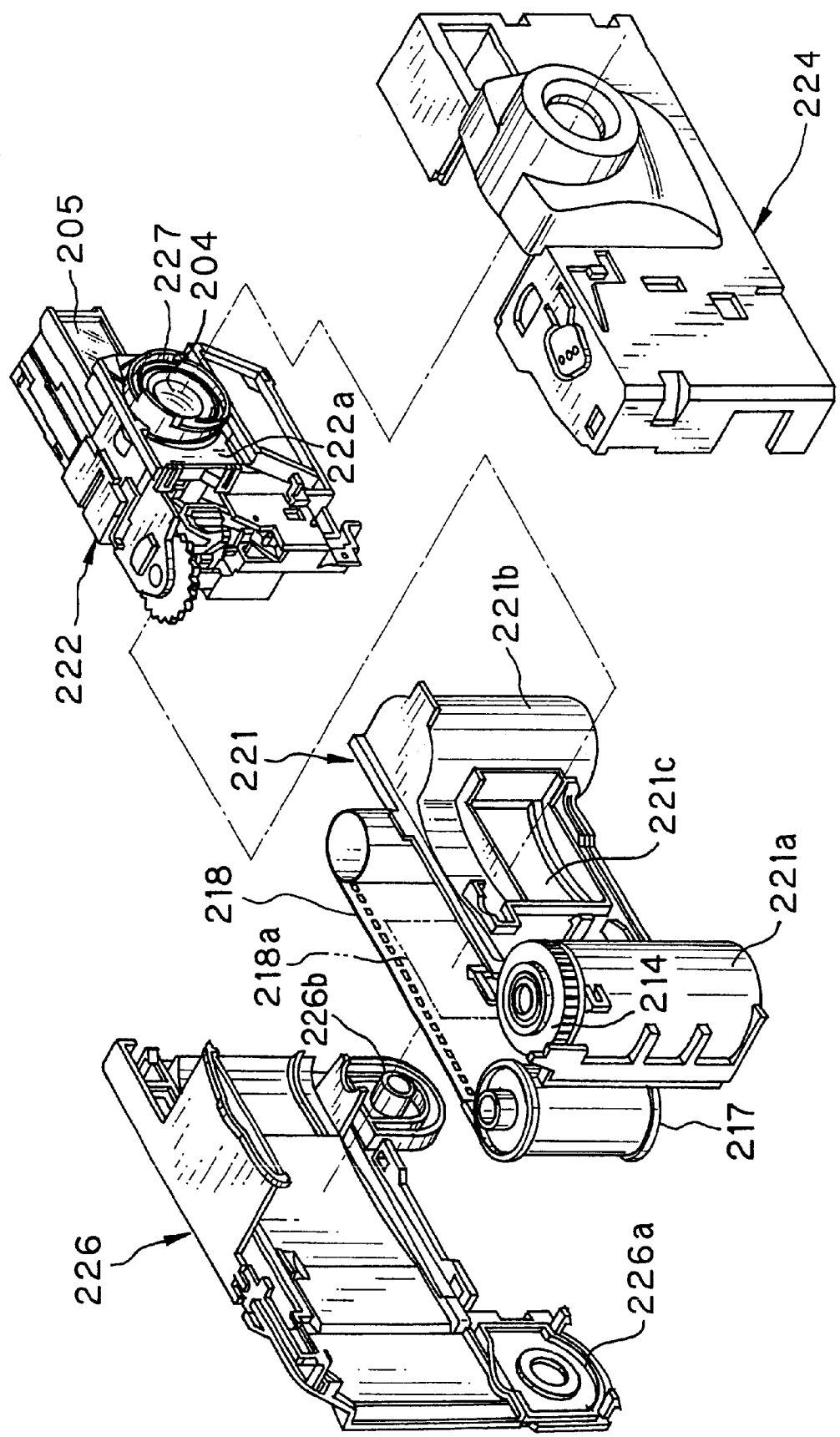
FIG. 16 is an exploded perspective illustrating the lens-fitted photo film unit.

In FIG. 16, a housing 202 includes a main body 221, an exposure unit 222, a front cover 224 and a rear cover 226. Photo film 218 is preloaded in the main body 221. The exposure unit 222 is secured to the front of the main body 221. The front cover 224 and the rear cover 226 cover the front and rear of the main body 221.

The main body 221 is one molded piece having a cassette holder chamber 221a and a roll holder chamber 221b. A photo film cassette 217 is contained in the cassette holder chamber 221a. A roll of the photo film 218 drawn from the photo film cassette 217 is contained in the roll holder chamber 221b.

Figure 17:
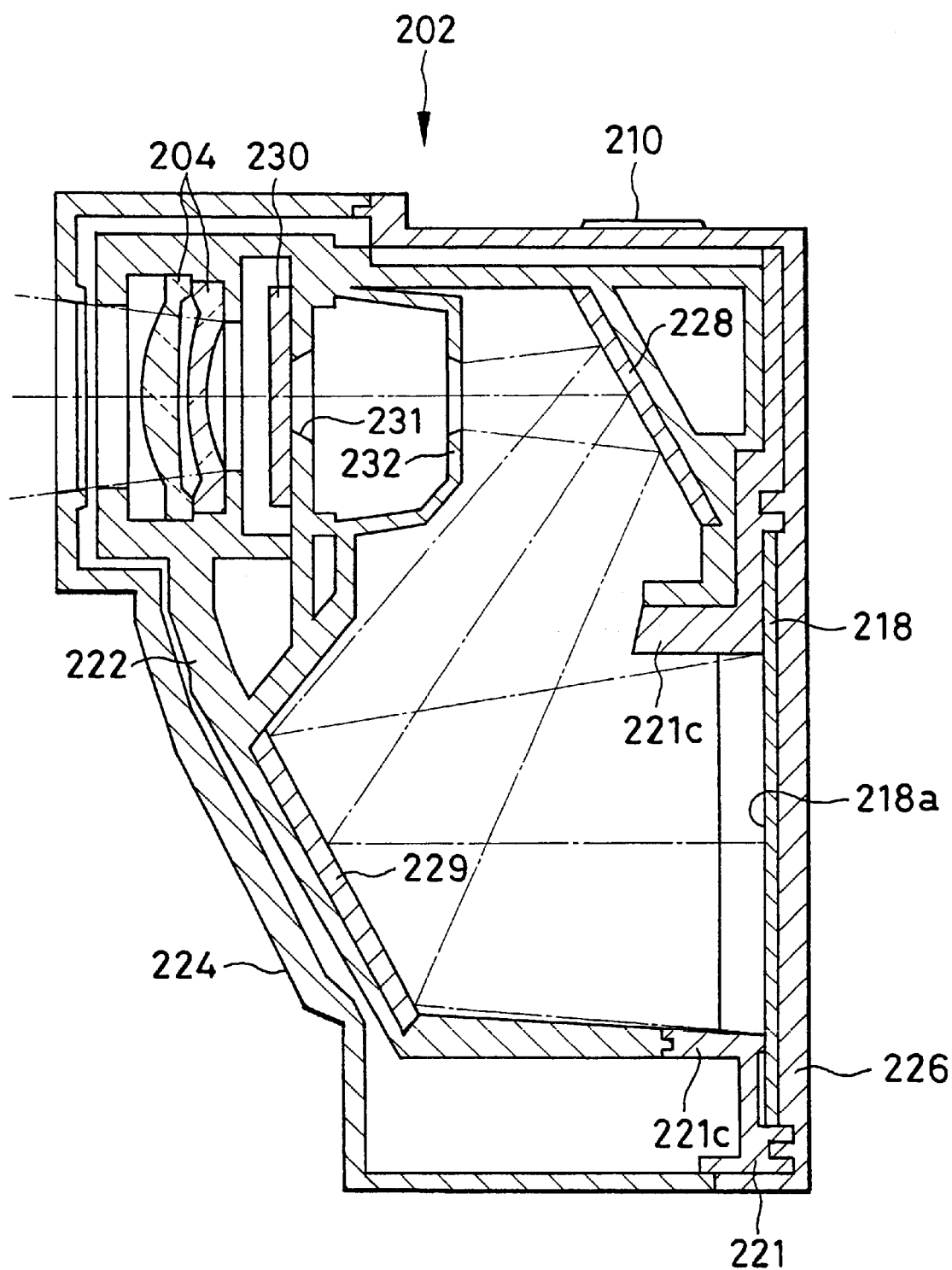
FIG. 17 is a cross section illustrating the lens-fitted photo film unit of FIG. 15.

The exposure unit 222 to be secured to the front of the main body 221 is a unit including a base portion 222a, which is provided with a shutter mechanism, a photo film retention mechanism, the viewfinder 205 and the like. A shutter blade 230 of FIG. 17 is included in the shutter mechanism. The viewfinder 205 includes an objective lens element and an eyepiece lens element. A lens holder 227 keeps the taking lens 204 positioned in front of the base portion 222a.

In FIG. 17, reflection mirrors 228 and 229 are incorporated in the exposure unit 222 of the lens-fitted photo film unit 201. A shutter opening 231 is disposed behind the shutter blade 230. Object light passing through the taking lens 204 becomes incident to a position in the main body 221 when the shutter blade 230 swings to open the shutter opening 231. In FIG. 17, a stop plate 232 is disposed for determining an aperture stop and keeping the object light path shielded from ambient light. Object light incident upon the reflection mirror 228 is reflected toward the reflection mirror 229, which reflects the same toward the photo film 218. Thus, the photo film 218 is exposed. Note that it is possible to use a prism for the purpose of reflecting the light path in the Z shape.

The Z-shaped light path makes it possible to effect telephotography in a compact structure. The taking lens 204 has a focal length of 100 mm. In the present embodiment, a photographic print is produced by the photographic printer according to the pseudo telephoto printing at a magnification ratio of 2 with reference to the standard photography, or in a manner of a photograph which would be obtained by use of a taking lens with a focal length of 200 mm. The view field of the viewfinder 205 is ¼ as large as the view field of a viewfinder of a conventional lens-fitted photo film unit, in consideration of a standard view field which would be obtained by use of the taking lens with the focal length of 200 mm. Note that the center of the view field of the viewfinder 205 is determined equal to that of the standard view field.

The rear cover 226 is secured behind the main body 221 and keeps the inside of the main body 221 shielded from ambient light. Lower lids 226a and 226b are formed with the rear cover 226 and cover respectively lower sides of the cassette holder chamber 221a and the roll holder chamber 221b.

In operation of manufacturing the lens-fitted photo film unit 201, the housing 202 is loaded with the photo film 218 and the photo film cassette 217, and provided with the rear cover 226. After this, a packaging sticker box 203 wraps the housing 202, and becomes packaged in a packaging bag 216 in a tightly sealed manner. External information 215 of "SUPER TELE" is printed on the packaging sticker box 203. Auxiliary external information 216a of "SUPER TELE" is printed on the packaging bag 216. Those indications make it possible to recognize that photographic prints will be obtained in the same manner as those obtained by a telephoto taking lens of 200 mm, and prevent users from erroneously purchasing lens-fitted photo film units. Note that the external information 215 and the auxiliary external information 216a may be letters, symbols or the like other than "SUPER TELE", for example, may be "200 MM TELE" or "6×TELE". The term 6-time means that the pseudo telephoto print is obtained in a manner of enlargement at a magnification 6 times as high as that in the standard photography with a taking lens of a short focal length and a standard enlarging magnification.

When the shutter release button 210 is depressed, the shutter mechanism is actuated. The shutter blade 230 moves to open the shutter opening 231, to take an exposure. While the shutter opening 231 is open, light passed through the taking lens 204 is directed to the shutter opening 231 and the stop plate 232, and becomes incident upon the reflection mirror 228. The reflection mirrors 228 and 229 direct the object light in the Z shape. An exposure aperture 221c is adapted to expose the photo film 218 with the object light having traveled in the Z shape.

Figure 18:
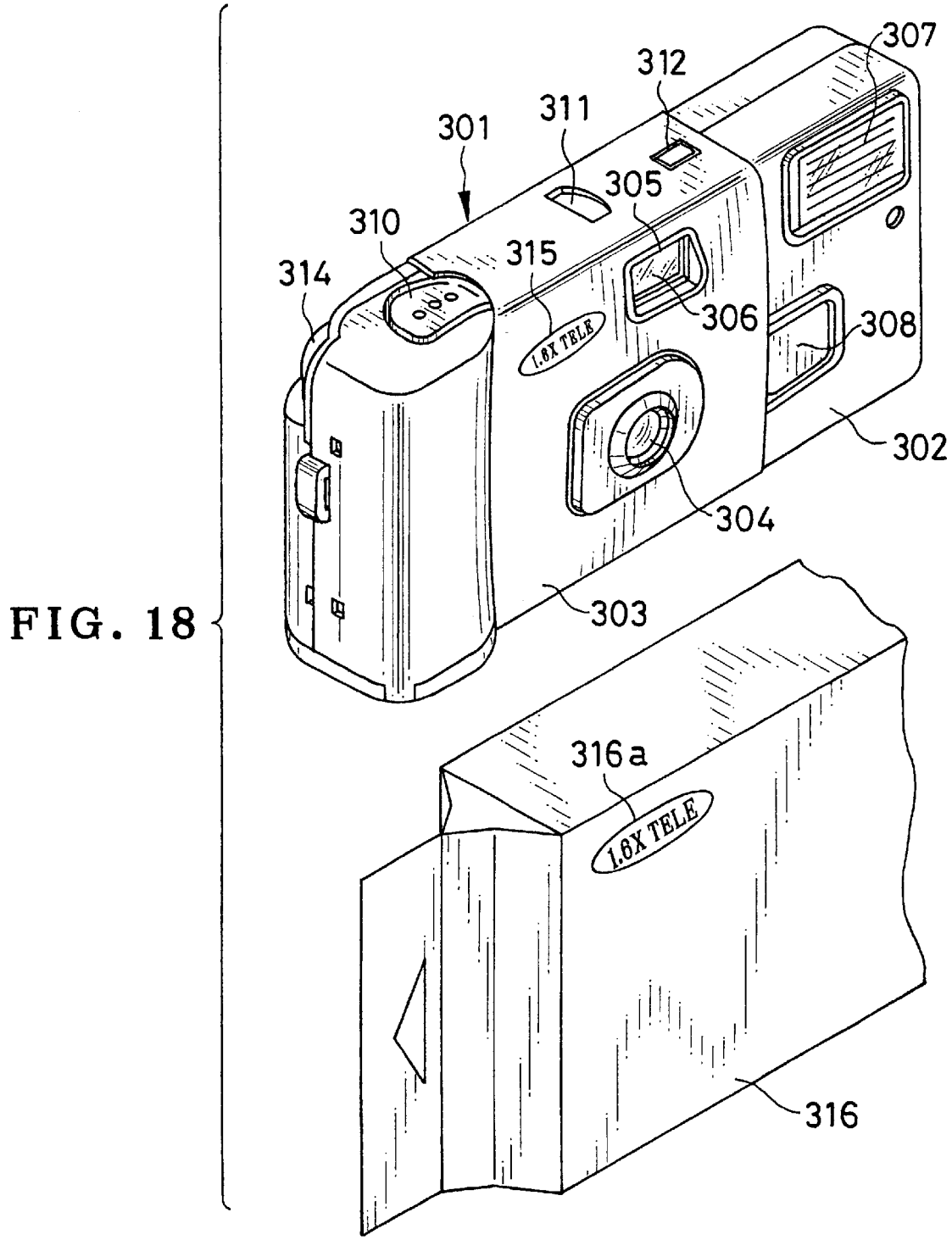
FIG. 18 is an exploded perspective illustrating another preferred lens-fitted photo film unit of a type of 1.6-time telephoto.

In FIG. 18, another preferred lens-fitted photo film unit 301 is depicted. The lens-fitted photo film unit 301 includes a housing 302 and a packaging sticker belt 303 for covering the housing 302 partially. The housing 302 accommodates various mechanisms for taking an exposure, and is preloaded with the IX240 type of photo film cassette 317 and photo film 318. See FIG. 19.

A taking lens 304 in the lens-fitted photo film unit 301 has a focal length of 24 mm equally to the conventional lens-fitted photo film unit. In the present embodiment, a photographic print is produced by the photographic printer according to the pseudo telephoto printing at a magnification ratio of 1.63 with reference to the standard photography, or in a manner of a photograph which would be obtained by use of a taking lens with a focal length of 39 mm. Note that the pseudo telephoto print has the C size.

The lens-fitted photo film unit 301 has the front where the taking lens 304 and an objective window 306 of a viewfinder 305, a flash emitter 307 and a charger button 308 are provided, has the upper side where a shutter release button 310, a frame counter window 311, and an indicator light guide 312 are provided, has the rear where a winder wheel 314 and an eyepiece window (not shown) of the viewfinder 305 are located. The charger button 308 is depressed for charging the flash unit. The frame counter window 311 indicates the number of remaining available frames. The indicator light guide 312 indicates completion of charging of the flash unit. The winder wheel 314 is rotated at each time of one exposure. The eyepiece window is directly behind the objective window 306.

An enlarging magnification of the viewfinder 305 is 1.63 times as high as that of a viewfinder of a conventional lens-fitted photo film unit so as to obtain a standard view field which would be obtained by use of a taking lens with a focal length of 39 mm. Note that the center of the view field of the viewfinder 305 is determined equal to that of the standard view field.

In the present embodiment, a taking lens for the C size is used. However, the photo film may be exposed with the taking lens for the H (wide-vision) size, and subjected to printing in enlargement with the printing lens for the panoramic printing. An enlarging magnification is 1.3 times as high as that of printing at the H size. In this case, a view field of the viewfinder 305 is such as to correspond to 1.3 times as high a focal length of a taking lens as that of a taking lens for the H size.

Figure 19:
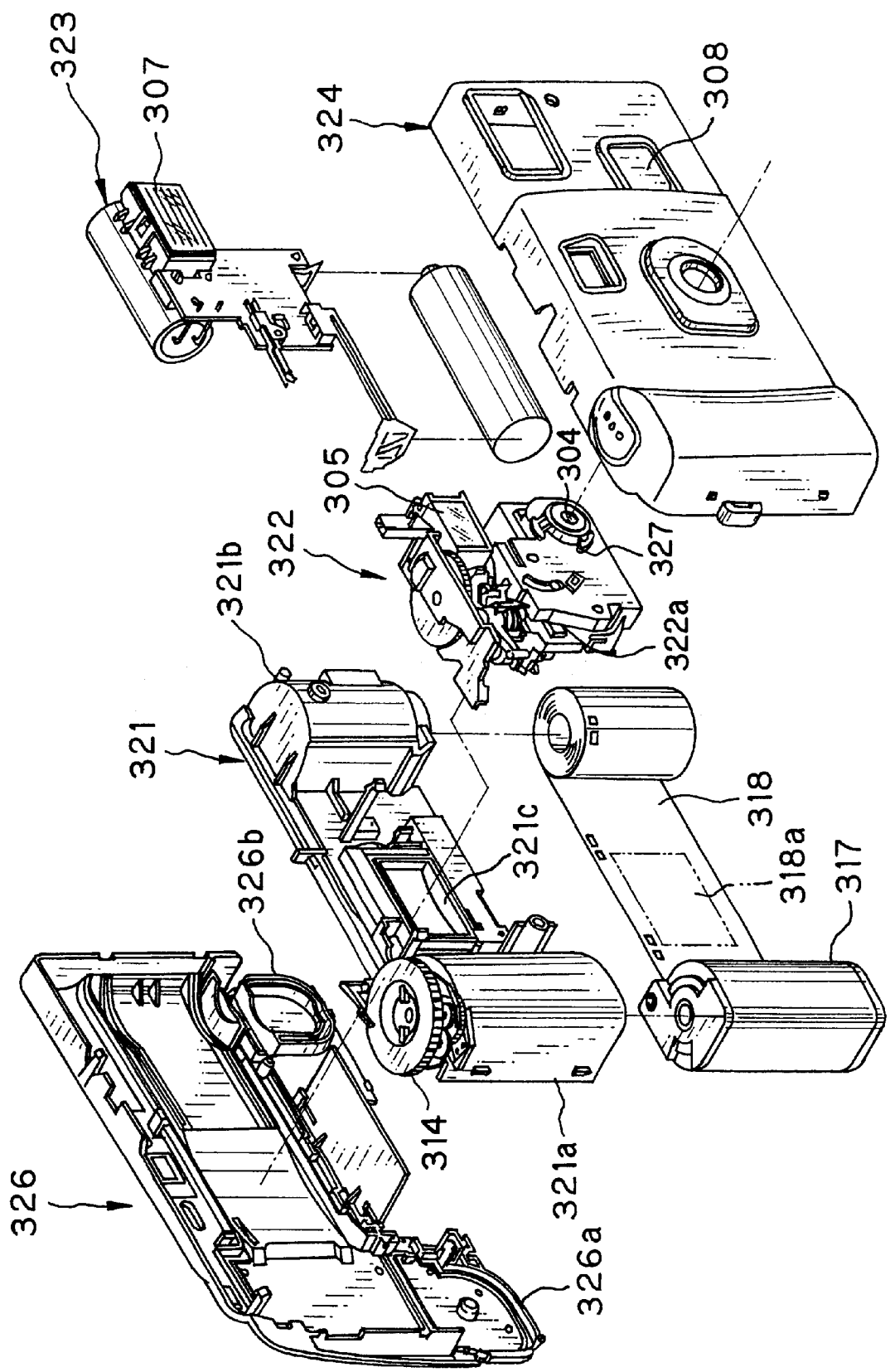
FIG. 19 is an exploded perspective illustrating the lens-fitted photo film unit of FIG. 18.

In FIG. 19, the housing includes a main body 321, an exposure unit 322, a flash unit 323, a front cover 324 and a rear cover 326. The main body 321 is preloaded with the photo film 318. The exposure unit 322 is secured to the front of the main body 321. The front cover 324 and the rear cover 326 cover the front and rear of the main body 321.

The main body 321 is one molded piece having a cassette holder chamber 321a and a roll holder chamber 321b. A photo film cassette 317 is contained in the cassette holder chamber 321a. A roll of the photo film 318 drawn from the photo film cassette 317 is contained in the roll holder chamber 321b.

Figure 20:
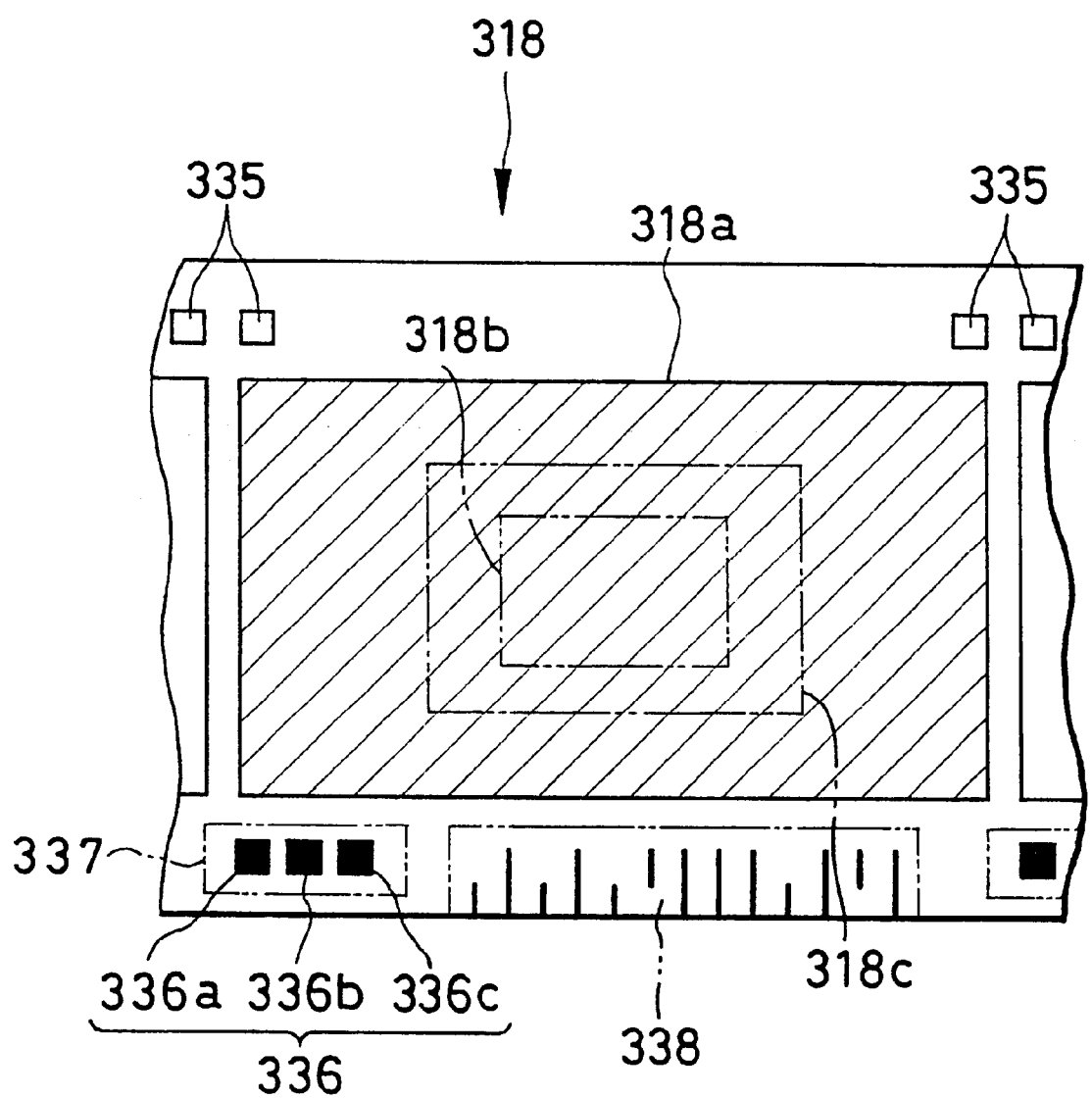
FIG. 20 is a plan illustrating photo film with imaging frames.

In FIG. 20, perforations 335 are formed on one edge portion of the photo film 318. Each of the perforations 335 is associated with an imaging frame 318a. There are an information exposure region 337 and an information region 338 disposed in one remaining edge portion of the photo film 318. The information exposure region 337 is defined for forming a discernment PAR code 336, which represents a printing aspect ratio (PAR) to be read by the photographic printer. The information region 338 stores various kinds of data of the photo film 318.

The discernment PAR code 336 has positions for code dots 336a, 336b and 336c of a rectangular quadrilateral shape. The code dots 336a and 336b are used to express a printing aspect ratio. The code dot 336c is used to designate the enlarged printing. Various printing aspect ratios are expressed by selective recording of the code dots 336a and 336b. Specifically, if the discernment PAR code 336 does not have either of the code dots 336a and 336b, this represents the H size (89×158 mm) of a photographic print. If the discernment PAR code 336 has the code dot 336a but not the code dot 336b, the discernment PAR code 336 represents the P size (89×254 mm) or panoramic size. If the discernment PAR code 336 has both of the code dots 336a and 336b, this represents an the C size (89×127 mm).

If the discernment PAR code 336 includes the code dot 336c, then it designates 1.63-time telephoto printing. If the printing at the H size and 1.63-time telephoto printing are desired, the discernment PAR code 336 is determined to have the code dot 336c without the code dots 336a and 336b. If the printing at the C size and 1.63-time telephoto printing are desired, the discernment PAR code 336 is determined to have all the code dots 336a, 336b and 336c.

The discernment PAR code 336 is prerecorded before loading the housing 302 with the photo film cassette 317. An exposure aperture 321c defines the imaging frame 318a where an exposure is taken. The discernment PAR code 336 is not exposed by object light, because located outside the imaging frame 318a. As the image exposed in the imaging frame 318a is printed at the enlarging magnification of 1.63 times, a telephoto trimming region 318b included in the imaging frame 318a is printed. In the present embodiment, the printing lens for the panoramic size is used to printing to a photographic paper sheet of the C size in enlargement of 1.63 times. Thus the discernment PAR code 336 includes all the code dots 336a, 336b and 336c.

The exposure unit 322 in front of the main body 321 is a unit including a base portion 322a, which is provided with a shutter mechanism, a photo film retention mechanism, the viewfinder 305 and the like. The viewfinder 305 includes an objective lens element and an eyepiece lens element. A lens holder 327 keeps the taking lens 304 positioned in front of the base portion 322a.

The rear cover 326 is secured behind the main body 321 and keeps the inside of the main body 321 shielded from ambient light. Lower lids 326a and 326b are formed with the rear cover 326 and cover respectively lower sides of the cassette holder chamber 321a and the roll holder chamber 321b.

Figure 21:
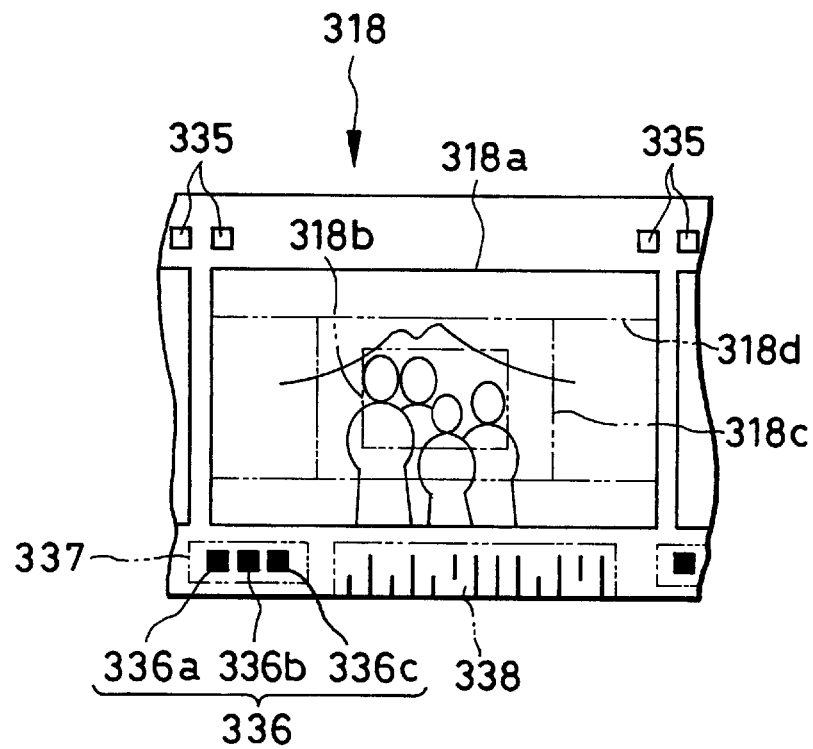
FIG. 21 is a plan illustrating the photo film after being developed.
Figure 22A:
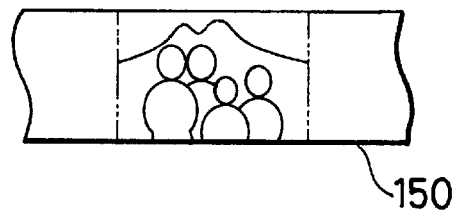
FIG. 22A is a plan illustrating a photographic print of the C size.
Figure 22B:
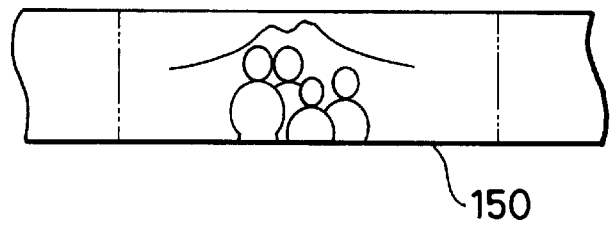
FIG. 22B is a plan illustrating a photographic print of the panoramic size.

In FIG. 21, a C trimming region 318c is a region printed to the photographic paper 150 in using the printing lens 147 for the standard C size. A panoramic trimming region 318d is a region printed to the photographic paper 150 in using the printing lens 147 for the panoramic size. Elements similar to those of the embodiment of FIG. 12 are designated with identical reference numerals. With reference to the negative image, the printing lens 147 has a magnification of 5.7 times for the C size, and has a magnification of 9.3 times for the panoramic size. In the C-size printing, the C trimming region 318c is printed as depicted in FIG. 22A. In the panoramic printing, the panoramic trimming region 318d is printed as depicted in FIG. 22B.

Figure 22C:
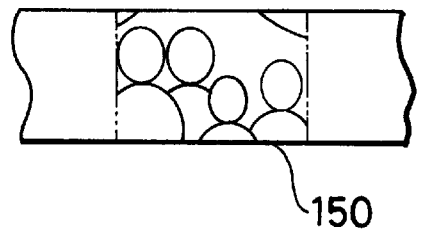
FIG. 22C is a plan illustrating a pseudo telephoto print of the C size.

To produce prints, the paper mask device 149 for the C size and the printing lens 147 for the panoramic size are used. With reference to the imaging frame, the printing lens 147 has a magnification of 5.7 times for the C size, and has a magnification of 9.3 times for the panoramic size. The magnification of the printing lens 147 for the panoramic size is 1.63 times as high as the magnification of the printing lens 147 for the C size. So a print is produced in enlargement at a ratio of 1.63. As the paper mask device 149 for the C size is used, image portions outside the C-size region are not printed. The telephoto trimming region 318b is printed in enlargement as illustrated in FIG. 22C. Note that the shape of the telephoto trimming region 318b is geometrically similar to that of the C trimming region 318c.

In the present embodiment, the paper mask device 149 for the C size and the printing lens 147 for the panoramic size are used for printing. The discernment PAR code 336 in the information exposure region 337 includes all of the code dots 336a, 336b and 336c. The housing 302, after insertion of the photo film 318 and the photo film cassette 317 and fixation of the rear cover, is provided with the packaging sticker belt 303 attached thereto. A packaging bag 316 is used for enclosing the lens-fitted photo film unit 301 in a tightly sealed manner. Then the product is shipped and sold. External information 315 is provided on an outside of the packaging sticker belt 303 to indicate that the lens-fitted photo film unit 301 is specialized for telephotography. Similarly, auxiliary external information 316a is provided on an outside of the packaging bag 316. So users do not misread the type of the lens-fitted photo film unit 301 at the purchasing or using time.

A user observes a photographic field through the viewfinder 305 with the view field corresponding to the telephoto trimming region 318b in FIG. 20, and frames a photographic object. As the viewfinder 305 has approximately 1.63 times as high a magnification as that according to an angle of view of the taking lens 304, the user views the photographic object in an enlarged manner.

After the control unit 161 reads the discernment PAR code 336, the control unit 161 adjusts and sets the printing lens 147 for panoramic printing. It is alternatively possible manually to set the printing lens 147 of a fixed focus type after removing the printing lens 147 of the standard printing. A magnification of the printing lens 147 is 5.7 times for the C size and 9.3 times for the panoramic size. The panoramic printing is in enlargement at a magnification ratio of 1.63 to the C-size printing. The use of the paper mask device 149 allows printing in the C-size region.

In the present embodiment, the printing lens 147 has a magnification of 5.7 times for the C size with reference to the imaging frame, and has a magnification of 9.3 times for the panoramic size. The panoramic print is produced in enlargement of approximately 1.63 times with reference to production of the C-size print. Also, it is possible that the printing lens 147 has a magnification of 9.0, 9.4 or 10.0 times or so for the panoramic size.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A lens-fitted photo film unit pre-loaded with photo film, comprising:
    a viewfinder adapted for observing an object;
    a selector member, operable externally, for being shifted to a standard position and a telephoto positions;
    a view region changer for setting said viewfinder in a standard view field when said selector member is in said standard position, and for setting said viewfinder in the telephoto view field when said selector member is in said telephoto position, send telephoto view field being included in said standard view field; and
    an information exposure unit for photographically recording telephoto discernment information to an information exposure region in said photo film when said selector member is in said telephoto position, said telephoto discernment information including at least three dots, for designating production of a pseudo telephoto print from a region in an imaging frame in said photo film corresponding to said telephoto view field;
    wherein said viewfinder includes at least one stationary lens element and at least one movable lens element movable with reference to said stationary lens element;
    said view region changer includes a moving mechanism mechanically connected between said selector member and said movable lens element, for setting said movable lens element to a short focus position when said selector member is in said standard position, and for setting said movable lens element to a long focus position when said selector member is in said telephoto position, so as to form said standard view field and said telephoto view field selectively.

2. A lens-fitted photo film unit as defined in claim 1, wherein when said selector member is in said standard position, said information exposure unit photographically records standard discernment information different from said telephoto discernment information to said information exposure region of said photo film.

3. A lens-fitted photo film unit as defined in claim 2, wherein said standard discernment information includes fewer dots than said telephoto discernment information.

4. A lens-fitted photo film unit as defined in claim 3, wherein said information exposure unit includes:
    an exposure light emitter for applying at least three light spots to said information exposure region;
    a changer plate, movable between first and second positions with respect to said exposure light emitter, for passing said at least three light spots when in said first position, so as to record said telephoto discernment information, and for blocking at least one of said at least three light spots when in said second position, so as to record said standard discernment information; and
    a transmission mechanism for setting said changer plate in said first position when said selector member is in said telephoto position, and for setting said changer plate in said second position when said selector member is in said standard position.

5. A lens-fitted photo film unit as defined in claim 4, wherein said exposure light emitter includes:
    a body inner wall opposed to said information exposure region;
    a light source, disposed inside said body inner wall, for emitting information recording light;
    at least three projecting holes, formed in said body inner wall, for forming said at least three light spots from said information recording light, and for being closed selectively by said changer plate.

6. A lens-fitted photo film unit as defined in claim 1, further comprising a taking lens having a predetermined angle of view and a predetermined focal length corresponding to said standard view field;
    wherein said telephoto view field is associated with a smaller angle of view than said predetermined angle of view, and said smaller angle of view corresponds to a telephoto focal length that is 1.3–2 times as great as said predetermined focal length.

7. A photofinishing method for producing a photographic print from an imaging frame in photo film that is loaded in the lens-fitted photo film unit of claim 1, comprising steps of:
    if production of a pseudo telephoto print is intended by use of a trimming region of said imaging frame, photographically recording telephoto discernment information including at least three dots to an information exposure region in said photo film at a time of an exposure of said imaging frame;
    if production of a standard print is intended by use of said imaging frame, photographically recording standard discernment information different from said telephoto discernment information to said information exposure region in said photo film at a time of an exposure of said imaging frame;
    processing said photo film;
    checking whether said telephoto discernment information or said standard discernment information exists;
    if it is judged that said standard discernment information exists, projecting an object image of said imaging frame to photographic paper at a standard enlarging magnification; and
    if it is judged that said telephoto discernment information exists, projecting said trimming region to said photographic paper at a telephoto enlarging magnification that is higher than said standard enlarging magnification.

8. A photofinishing method as defined in claim 7, wherein said standard discernment information includes fewer dots than said telephoto discernment information.

9. A photofinishing method as defined in claim 7, wherein said telephoto enlarging magnification is 1.3–2 times as high as said standard enlarging magnification.

* * * * *